(12) United States Patent
Homma

(10) Patent No.: US 9,417,862 B2
(45) Date of Patent: Aug. 16, 2016

(54) INFORMATION PROCESSING APPARATUS, FUNCTION EXTENSION METHOD FOR INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Takayuki Homma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/806,946

(22) Filed: Jul. 23, 2015

(65) Prior Publication Data

US 2016/0034263 A1    Feb. 4, 2016

(30) Foreign Application Priority Data

Aug. 4, 2014    (JP) ................................. 2014-158990

(51) Int. Cl.
*G06F 9/44*     (2006.01)
*G06F 9/445*    (2006.01)

(52) U.S. Cl.
CPC .............. *G06F 8/61* (2013.01); *G06F 9/44526* (2013.01); *G06F 8/65* (2013.01); *G06F 8/67* (2013.01); *G06F 8/71* (2013.01)

(58) Field of Classification Search
CPC ............... G06F 8/60; G06F 8/61; G06F 8/65; G06F 8/67; G06F 8/71
See application file for complete search history.

(56) References Cited

U.S. PATENT DOCUMENTS

| 9,015,628 | B2* | 4/2015 | Kuroyanagi | 715/835 |
| 2009/0217349 | A1* | 8/2009 | Terashita | 726/2 |
| 2010/0107152 | A1* | 4/2010 | Kwon | G06F 8/60 717/174 |

(Continued)

FOREIGN PATENT DOCUMENTS

JP    4039439 B2    1/2008

OTHER PUBLICATIONS

Bodhuin et al., "A Search-Based Approach for Dynamically Re-packaging Downloadable Applications", CASCON '07, Oct. 2007, IBM Corporation, pp. 1-15; <http://dl.acm.org/citation.cfm?id=1321215&CFID=804789808&CFTOKEN=19243874>.*

(Continued)

*Primary Examiner* — Thuy Dao
*Assistant Examiner* — Ben C Wang
(74) *Attorney, Agent, or Firm* — Carter, DeLuca, Farrell & Schmidt, LLP

(57) ABSTRACT

An information processing apparatus provided with an extension unit for performing control to download and install an extension program for extending functionality, the extension unit comprises: a first control unit that performs control to download from an external server an introduction program that provides information about the extension program which can be downloaded, and installs the introduction program; an obtaining unit that obtains, from the installed introduction program, information about the extension program; a provision unit that provides a screen for displaying the obtained information about the extension program and for receiving an instruction to install the extension program; and a second control unit that, in response to the instruction by a user via the screen, performs control to use key information included in the obtained information to download and install the extension program.

9 Claims, 23 Drawing Sheets

(56) References Cited

U.S. PATENT DOCUMENTS

| | | | | |
|---|---|---|---|---|
| 2011/0066972 A1* | 3/2011 | Sugiura | | G06F 8/61 715/806 |
| 2011/0093813 A1* | 4/2011 | Watanabe | | G06F 8/61 715/810 |
| 2012/0023451 A1* | 1/2012 | Kuroyanagi | | G06F 8/38 715/835 |
| 2014/0215454 A1* | 7/2014 | Fujii | | G06F 8/61 717/174 |
| 2015/0058835 A1* | 2/2015 | Hayami | | G06F 8/61 717/170 |
| 2015/0067671 A1* | 3/2015 | Kamiya | | G06F 8/61 717/174 |
| 2015/0264211 A1* | 9/2015 | Araki | | H04N 1/00347 358/1.15 |
| 2015/0286474 A1* | 10/2015 | Suzuki | | G06F 8/62 717/174 |
| 2015/0355894 A1* | 12/2015 | Hayami | | G06F 8/62 717/174 |
| 2016/0034263 A1* | 2/2016 | Homma | | G06F 8/61 717/178 |
| 2016/0034264 A1* | 2/2016 | Hayashi | | G06F 8/61 717/178 |

OTHER PUBLICATIONS

Aly et al., "Building Extensions for Applications: Towards the Understanding of Extension Possibilities", May 2013, IEEE, pp. 182-191; <http://ieeexplore.ieee.org/stamp/stamp.jsp?tp=&arnumber=6613846>.*

Aly et al., "Understanding Multilayered Applications for Building Extensions", Mar. 2013, ACM, pp. 1-5; <http://dl.acm.org/citation.cfm?id=2451594&CFID=804789808&CFTOKEN=19243874>.*

* cited by examiner

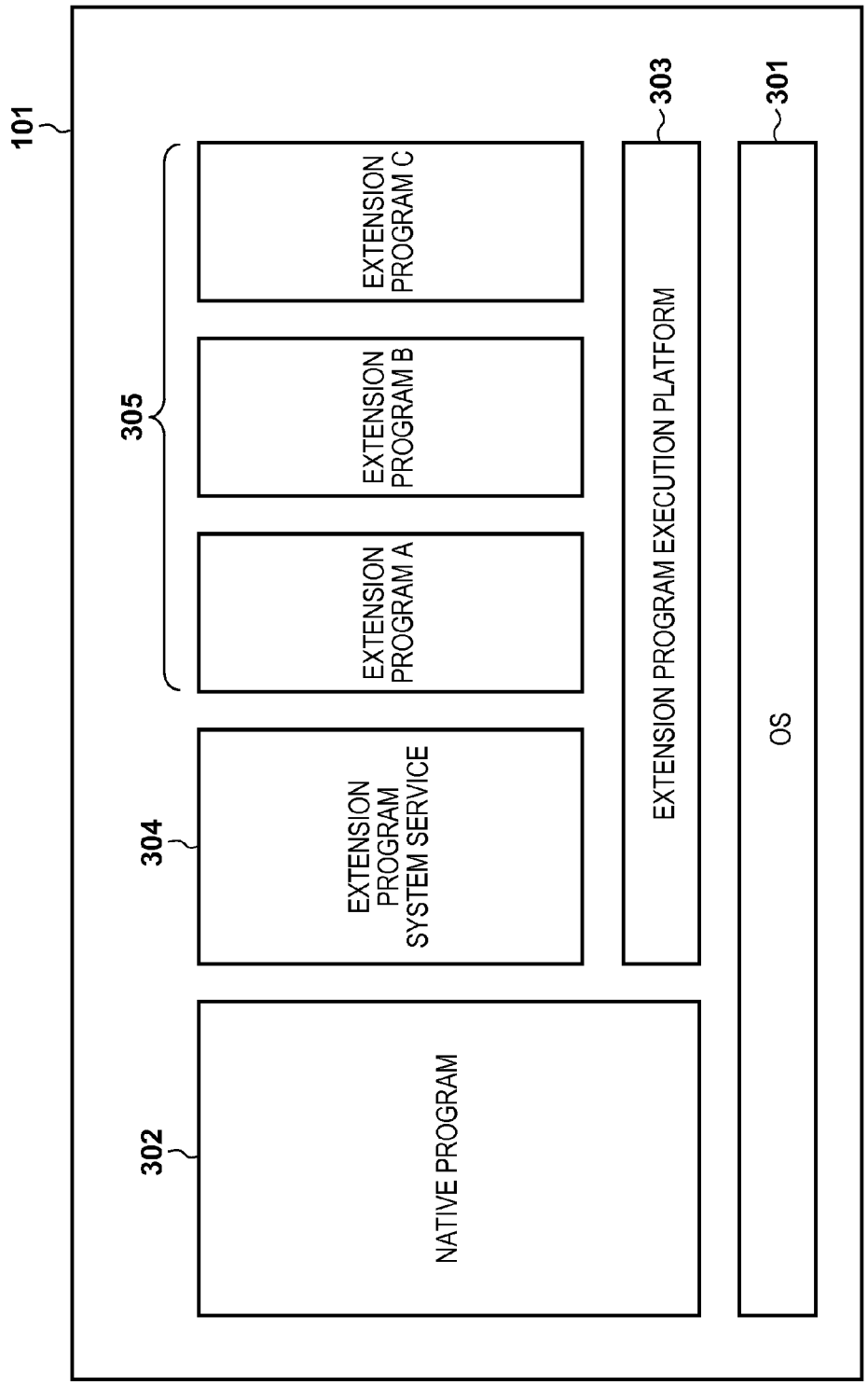

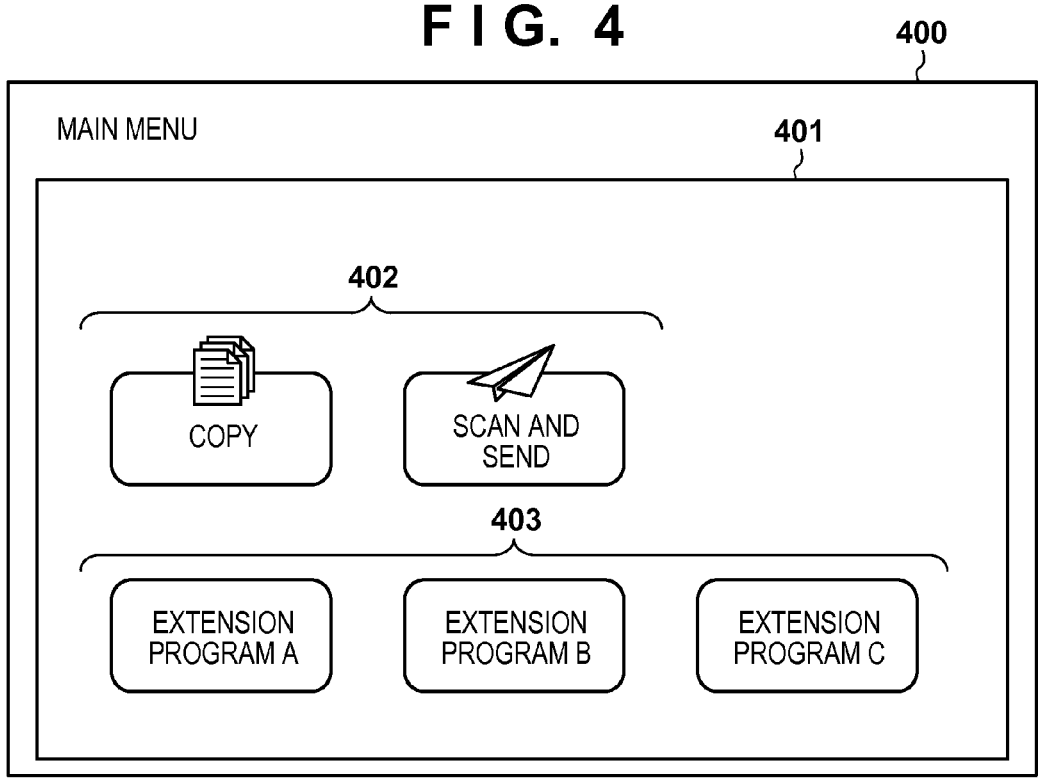
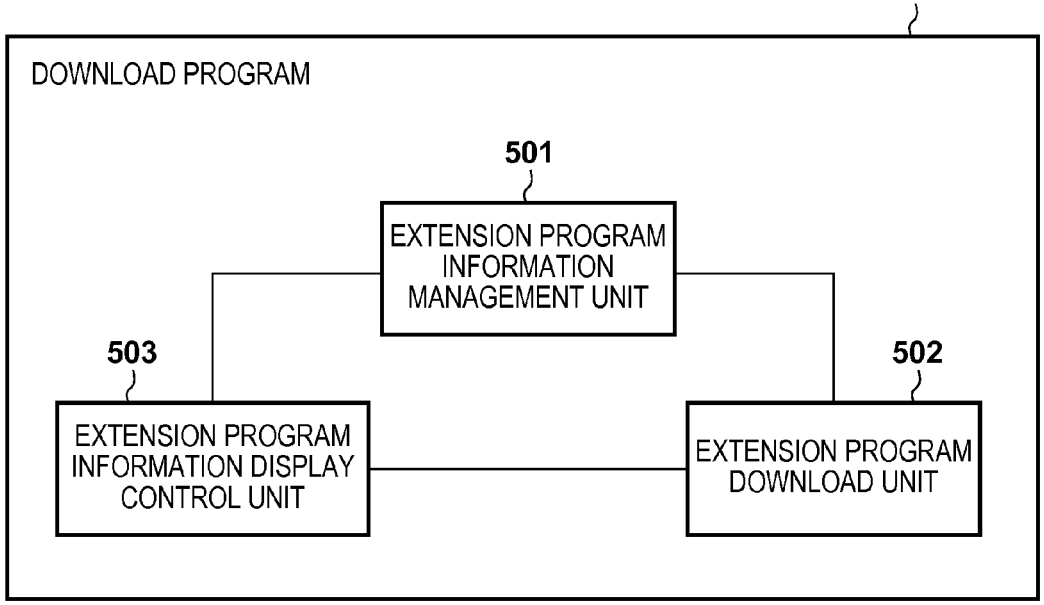

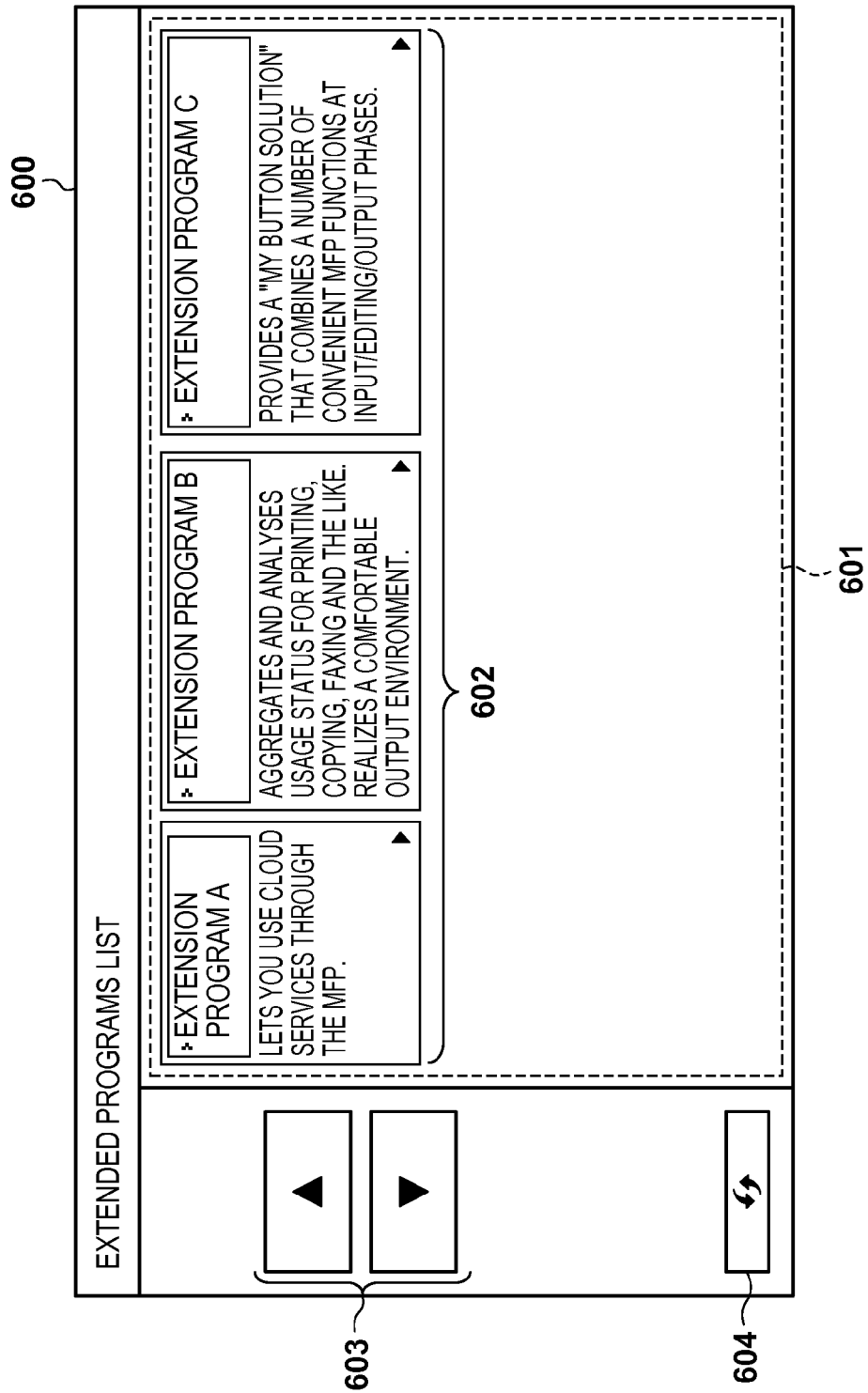

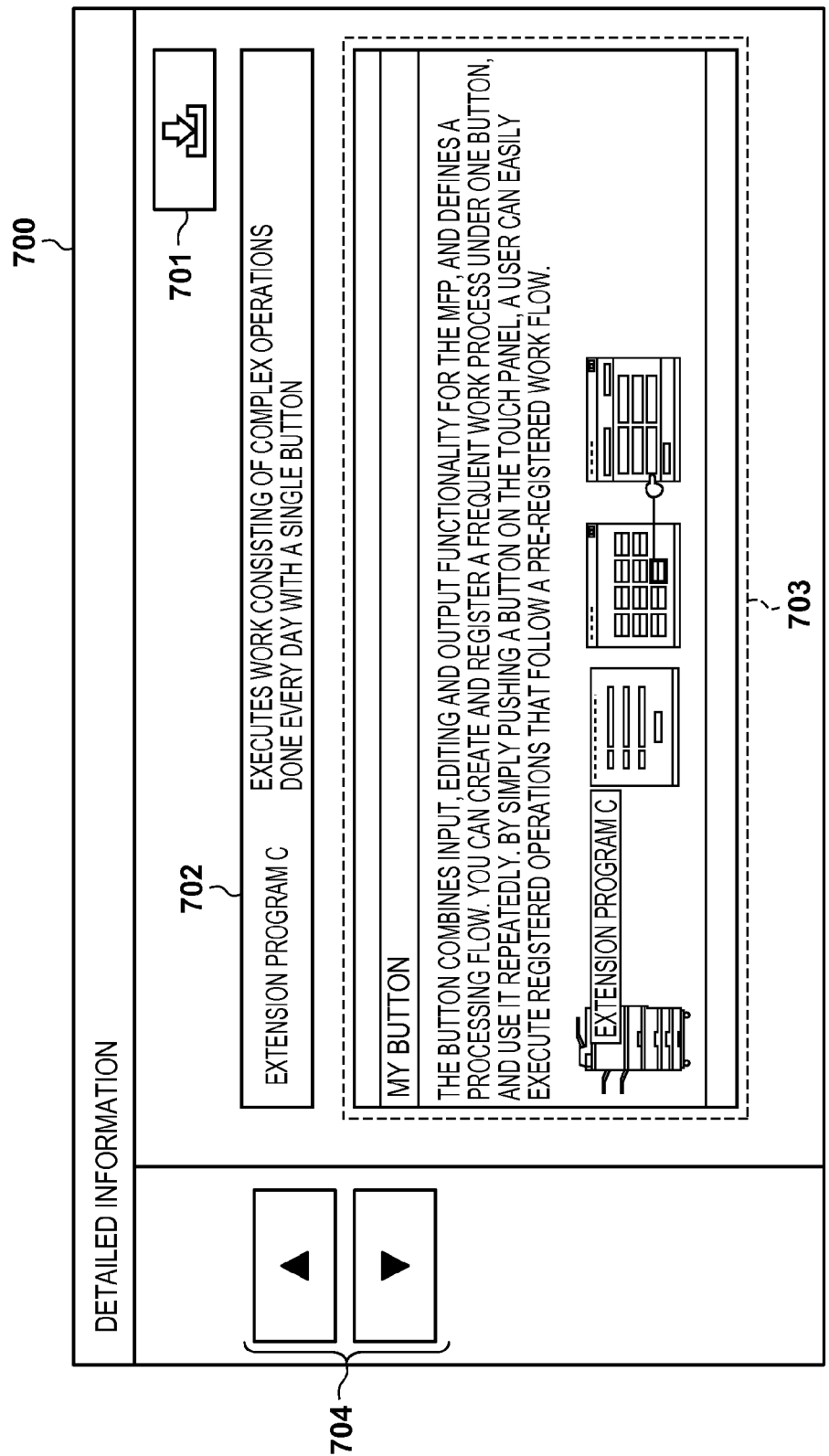

F I G. 8
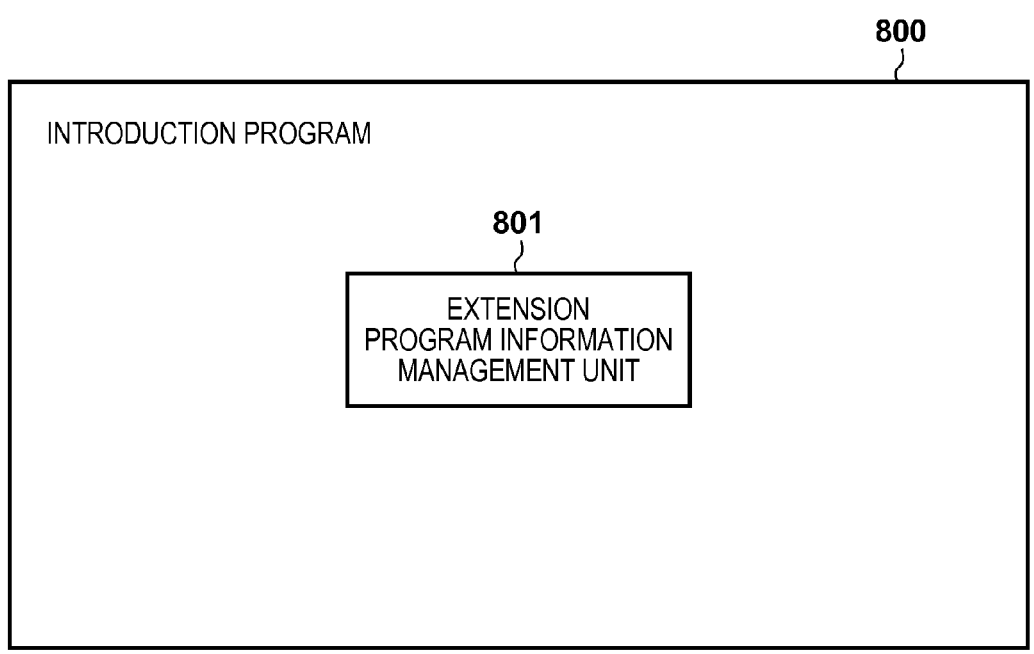

explanation_1.png explanation_2.png

F I G. 11C
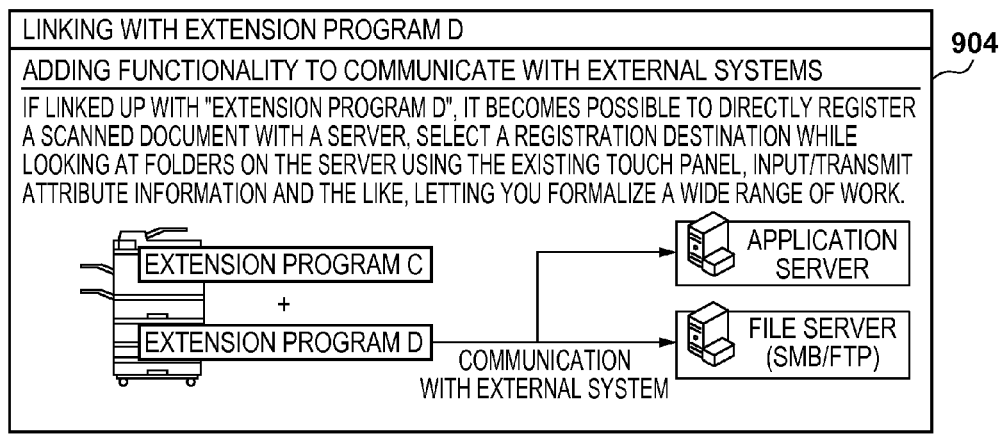
explanation_3.png
F I G. 12A
ListButton.png
F I G. 12B
DetailTitle.png

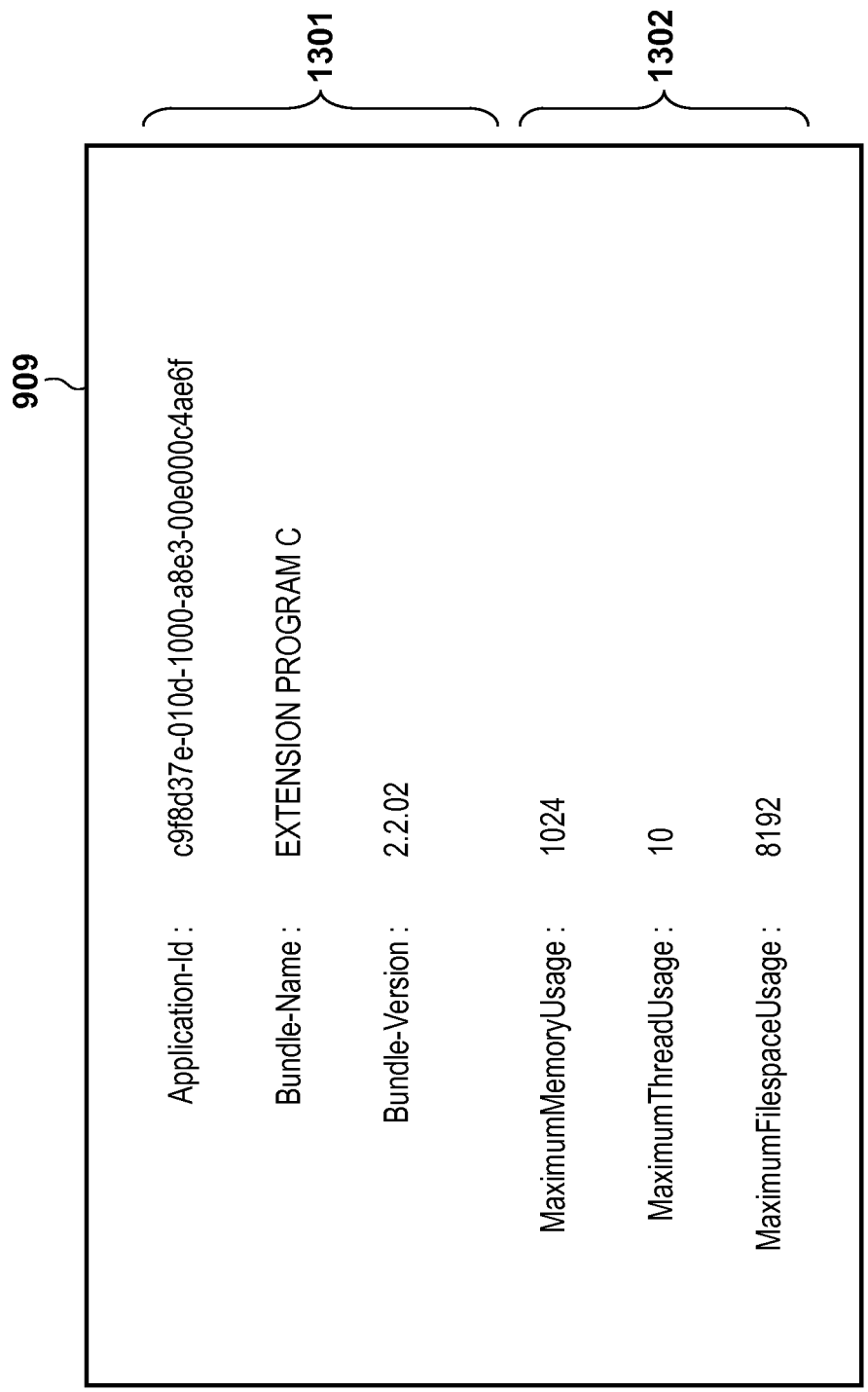

FIG. 14A

AppName : EXTENSION PROGRAM C
AppSummary : This program provides MyButton solution. ～1402

AppName : EXTENSION PROGRAM C
AppSummary : 便利な複合機の機能を入力・編集・出力フェーズで複数組み合わせて「マイボタンソリューション」を提供します。～1402

912

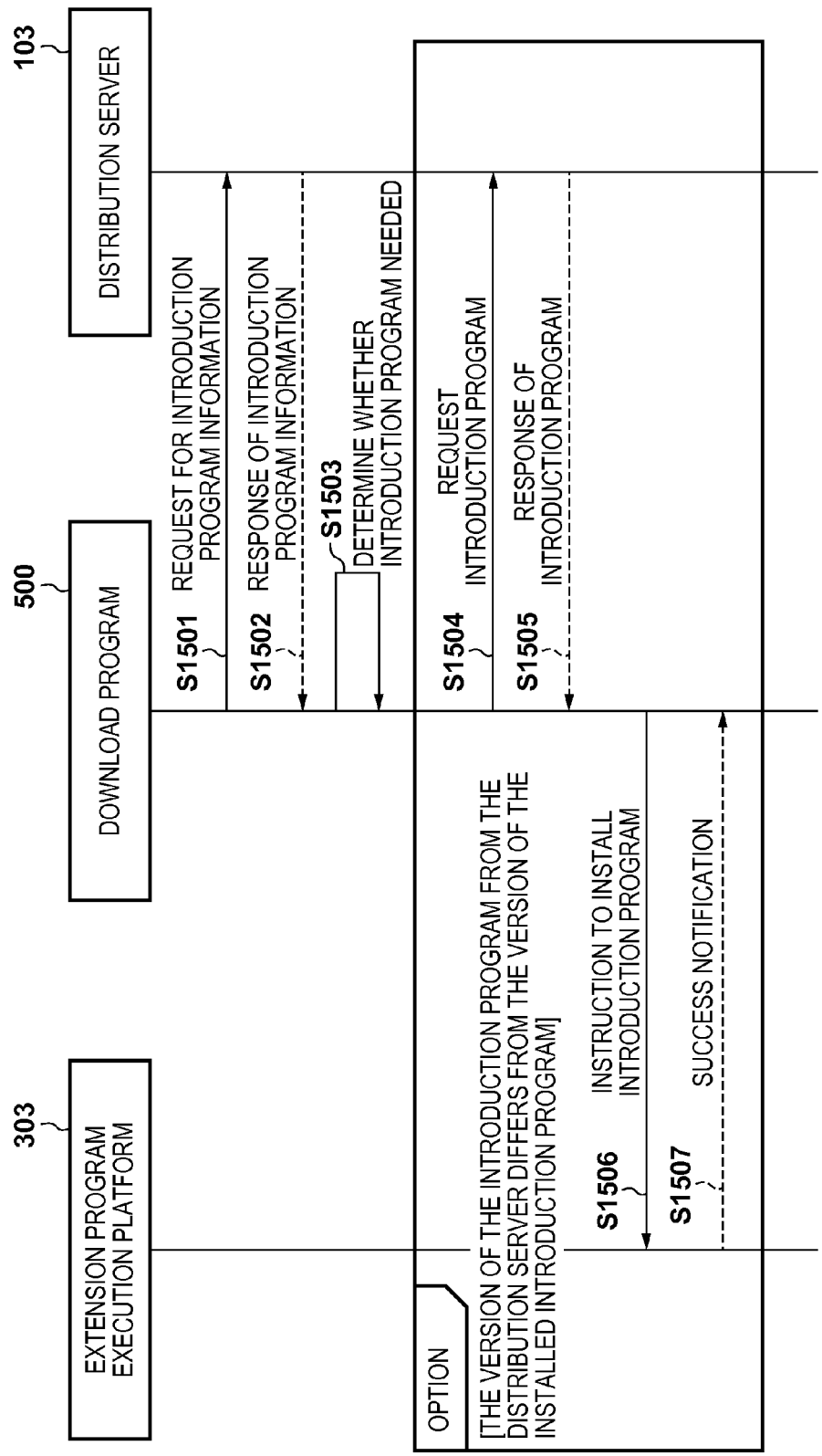

F I G. 18
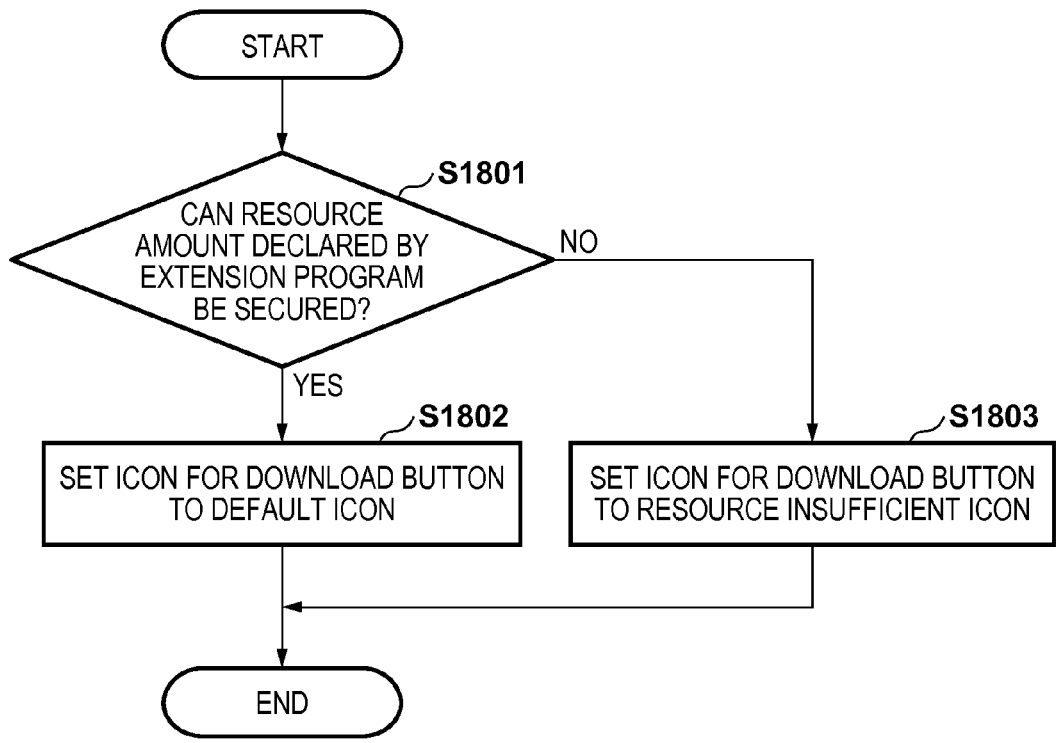

F I G. 19A
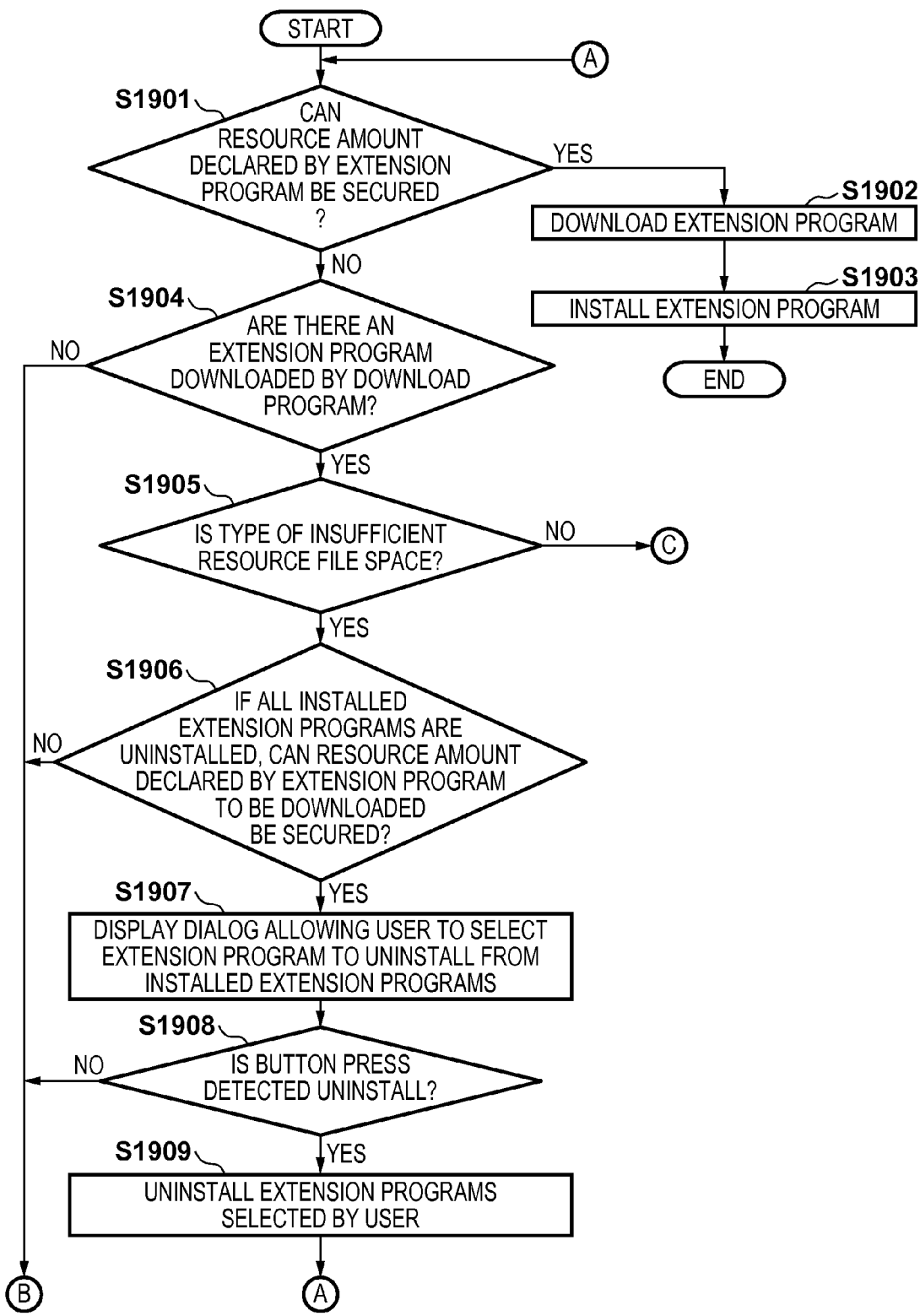

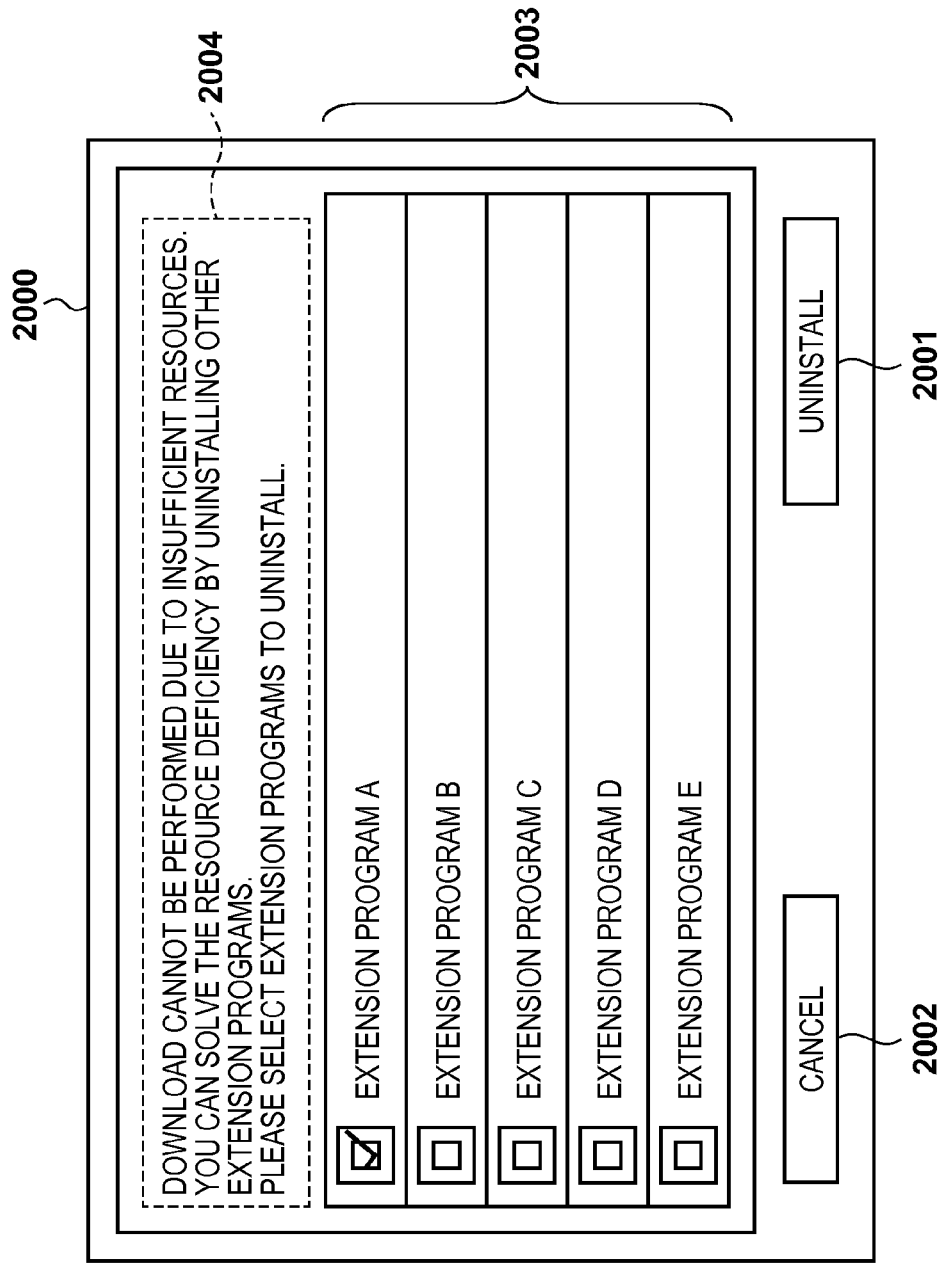

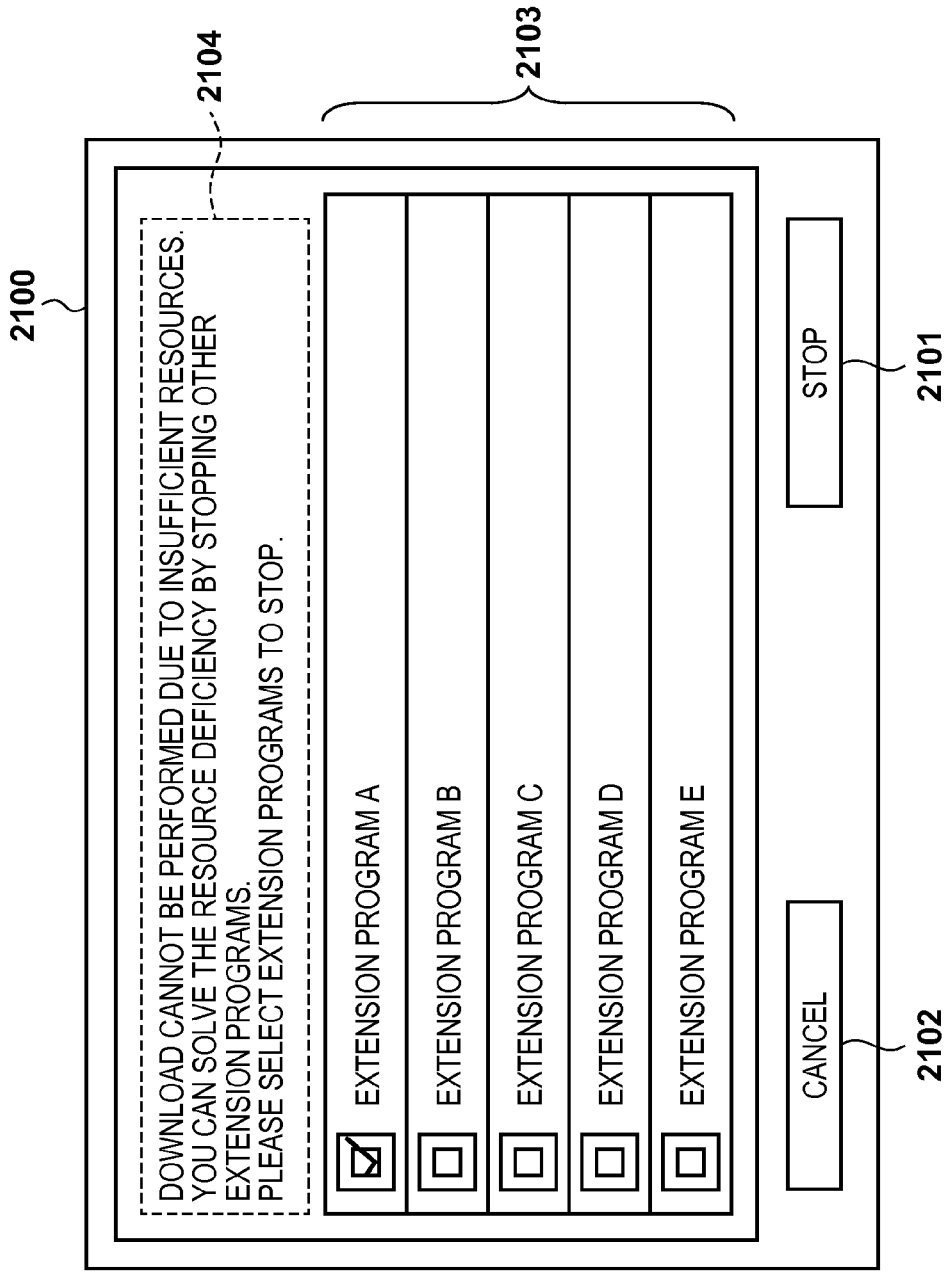

INFORMATION PROCESSING APPARATUS, FUNCTION EXTENSION METHOD FOR INFORMATION PROCESSING APPARATUS, AND NON-TRANSITORY COMPUTER-READABLE STORAGE MEDIUM

BACKGROUND OF THE INVENTION

1. Field of the Invention

The present invention relates to an information processing apparatus, a function extension method for an information processing apparatus, and a non-transitory computer readable medium.

2. Description of the Related Art

In recent years, systems capable of extending the functions of an image forming apparatus located in an office dynamically by installation of programs for function extension on the image forming apparatus are spreading. For example, one type of this system is Canon Inc.'s MEAP (registered trademark), or the like.

There is also known a technique which enables the function extension of an image forming apparatus by downloading of a program for function extension from an external server and installation of said program (for example, refer to Japanese Patent No. 4039439).

In the above described technique, because the means for obtaining information about the program for function extension is different from the means for downloading the program for function extension and installing said program, there is the possibility that the cost and difficulty of development and maintenance will be high. This is also a reason for reduced convenience of the system felt by users.

SUMMARY OF THE INVENTION

In view of the above described issues, the present invention provides an information processing apparatus comprising a means for a user to easily and at low-cost download a program for function extension from an external server and install the program.

According to one aspect of the present invention, there is provided an information processing apparatus provided with an extension unit for performing control to download an extension program for extending functionality from an external server and to install the extension program, the extension unit comprising: a first install control unit configured to perform control to download from the external server an introduction program that provides information about the extension program which can be downloaded from the external server, and to install the introduction program; an obtaining unit configured to obtain, from the installed introduction program, information about the extension program which can be downloaded; a provision unit configured to provide a screen for displaying the information about the extension program obtained by the obtaining unit and for receiving an instruction to install the extension program; and a second install control unit configured, in response to receipt of the instruction to install the extension program from a user via the screen, after information corresponding to the extension program is obtained by the obtaining unit from the introduction program, to perform control to use key information included in the obtained information to download the extension program from the external server and install the extension program.

According to another aspect of the present invention, there is provided a function extension method in an information processing apparatus provided with an extension unit for performing control to download an extension program for extending functionality from an external server and to install the extension program, the method comprising: by the extension unit, a first install control step of performing control to download from the external server an introduction program that provides information about an extension program which can be downloaded from the external server, and to install the introduction program; an obtaining step of obtaining, from the installed introduction program, information about an extension program which can be downloaded; a provision step of providing a screen for displaying information about the extension program obtained in the obtaining step and for receiving an instruction to install the extension program; and a second install control step of, in response to receipt of the instruction to install the extension program from a user via the screen, after information corresponding to the extension program is obtained in the obtaining step from the introduction program, performing control to use key information included in the obtained information to download the extension program from the external server and install the extension program.

According to another aspect of the present invention, there is provided a non-transitory computer readable medium storing a program for causing a computer to function as a first install control unit configured to perform control to download from an external server an introduction program that provides information about an extension program which can be downloaded from the external server, and to install the introduction program; an obtaining unit configured to obtain, from the installed introduction program, information about an extension program which can be downloaded; a provision unit configured to provide a screen for displaying the information about the extension program obtained by the obtaining unit and for receiving an instruction to install the extension program; and a second install control unit configured, in response to receipt of the instruction to install the extension program from a user via the screen, after information corresponding to the extension program is obtained by the obtaining unit from the introduction program, to perform control to use key information included in the obtained information to download the extension program from the external server and install the extension program.

According to the present invention, it is possible to provide an information processing apparatus comprising a means for a user to easily and at low-cost download a function extension program from an external server.

Further features of the present invention will become apparent from the following description of exemplary embodiments (with reference to the attached drawings).

BRIEF DESCRIPTION OF THE DRAWINGS

FIG. 3 is a view for illustrating an example configuration of software of the image forming apparatus in accordance with the present application invention.

FIG. 4 is a view for illustrating an example configuration of a main menu screen in accordance with the present application invention.

FIG. 5 is a view for showing an example of a functional configuration of a download program in accordance with the present application invention.

FIG. 6 is a view for showing an example of a distributable extension program list screen in accordance with the present application invention.

FIGS. 7A and 7B are views for showing examples of a distributable extension program details screen in accordance with the present application invention.

FIG. 8 is a view for showing an example of a functional configuration of an introduction program in accordance with the present application invention.

FIGS. 11A, 11B and 11C are views for showing examples of information included in distributable extension program information in accordance with the present application invention.

FIGS. 12A and 12B are views for showing examples of information included in distributable extension program information in accordance with the present application invention.

FIG. 13 is a view for showing an example of information included in distributable extension program information in accordance with the present application invention.

FIGS. 14A and 14B are views for showing examples of information included in distributable extension program information in accordance with the present application invention.

FIG. 15 is a view for showing a download process of an introduction program in accordance with the present application invention.

FIG. 18 is a view showing an icon change process for a download button in accordance with the present application invention.

FIGS. 19A and 19B are views for showing download and install processes of an extension program in accordance with the present application invention.

FIG. 20 is a view for showing an example of a selection dialog during uninstallation in accordance with the present application invention.

FIG. 21 is a view for showing an example of a selection dialog for when stopping in accordance with the present application invention.

DESCRIPTION OF THE EMBODIMENTS

System Configuration

Figure 1:
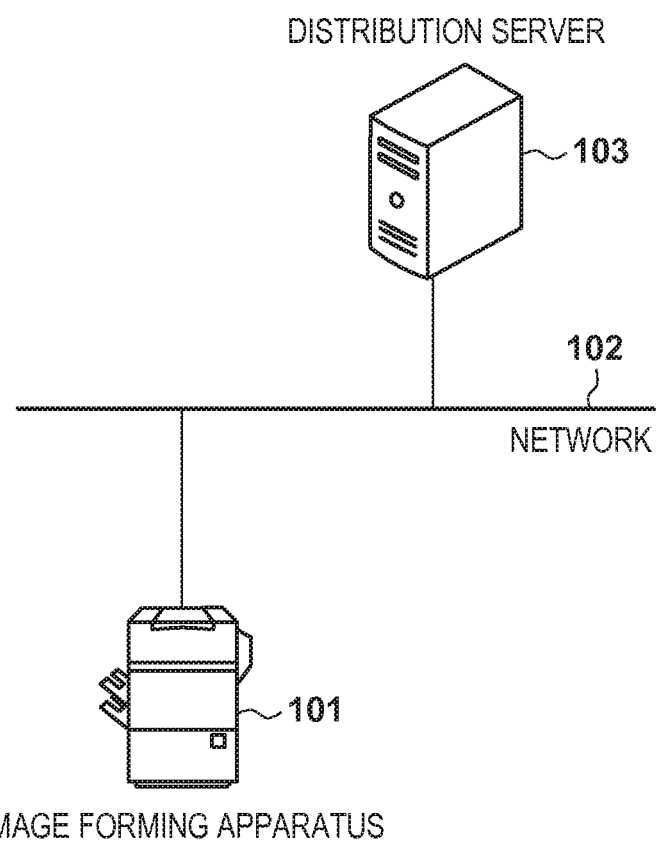
FIG. 1 is a view for illustrating an example configuration of a distribution system in accordance with the present application invention.

Explanation is given below for embodiments according to the present invention using drawings. FIG. 1 is a view for showing an example of a device configuration of a distribution system comprising an image forming apparatus capable of applying a function extension method in accordance with the present application invention. The distribution system including the image forming apparatus of the present application invention is comprised by an image forming apparatus 101, a network 102, and a distribution server 103.

The image forming apparatus 101 is a multi-function peripheral (MFP: Multi Function Peripheral) which integrates a plurality of functions, such as a scanner function, printer function, a facsimile function and file transmission function. The image forming apparatus 101 is connected to the network 102. The network 102 is a so-called a computer network, and is a communication network capable of freely exchanging information between devices connected thereto. The network 102 may exist at various scales, such as a LAN (Local Area Network) or the Internet, but may be of any scale in the present embodiment. The distribution server 103 is an external server capable of holding and managing extension programs, and of distributing an extension program in response to a request from another device, such as the image forming apparatus 101. Also, the distribution server 103 is connected to the network 102. Because the image forming apparatus 101 and the distribution server 103 are both connected to the network 102, they are able to exchange information.

Note that while a single instance of the image forming apparatus 101 is shown in FIG. 1, a plurality may be included. The processing of the distribution server 103 may be distributed to a plurality of physically separate information processing apparatuses. An image forming apparatus is given as an example of a device that performs function extension in the present embodiment, but said device may be another information processing apparatus, such as a PC.

[Image Forming Apparatus]

Figure 2:
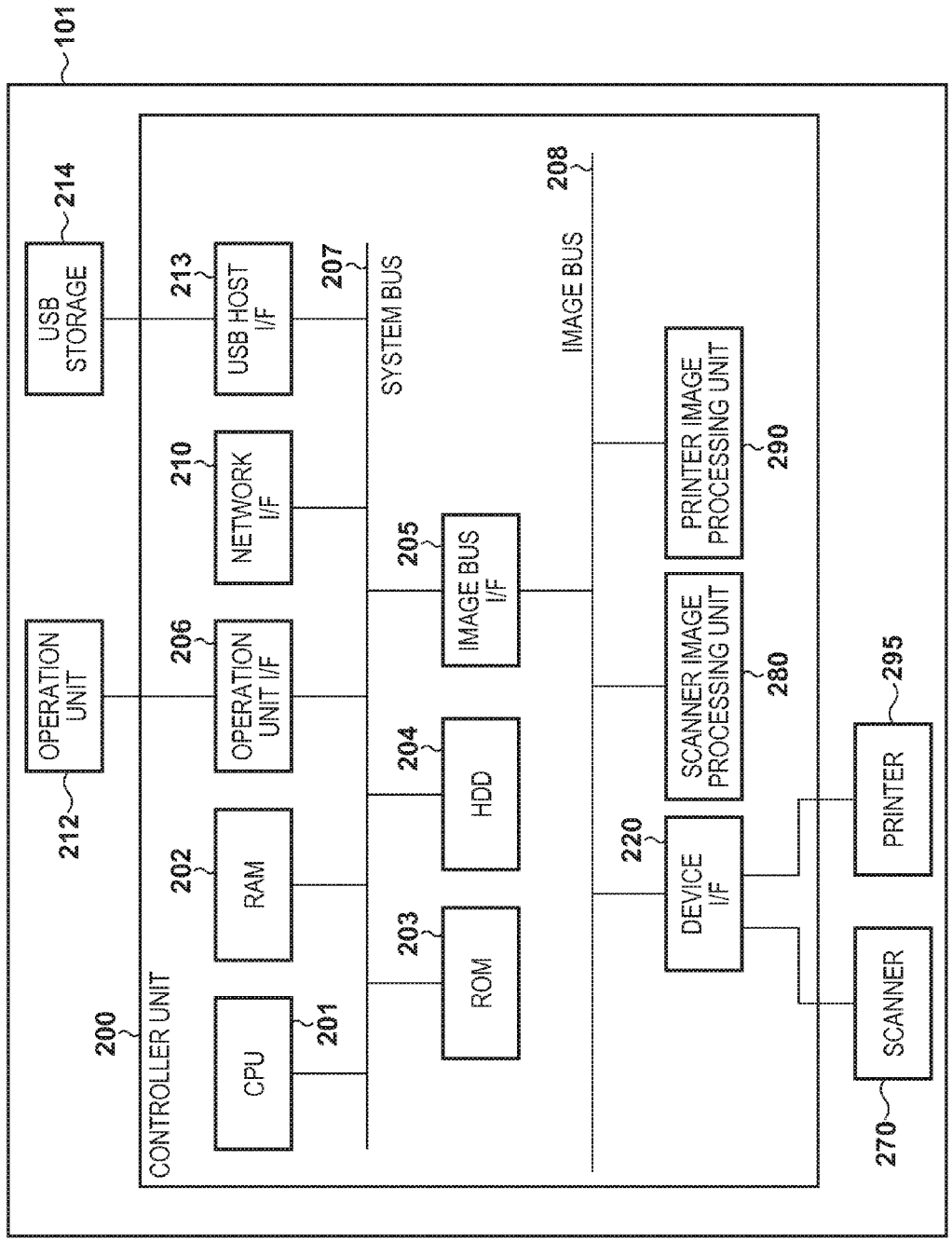
FIG. 2 is a view for illustrating an example configuration of main parts of an image forming apparatus in accordance with the present application invention.

FIG. 2 is a block diagram for showing an example configuration of main components of the image forming apparatus 101. The image forming apparatus 101 includes a controller unit 200. The controller unit 200 is connected to a scanner 270, which is an image input device, a printer 295, which is an image output device, and an operation unit 212. The controller unit 200 performs control to realize a copy function by printing out image data, read by the scanner 270, by means of the printer 295.

The controller unit 200 includes a CPU 201. The CPU 201 starts up an OS (Operating System) by means of a boot program stored in a ROM 203. The CPU 201, via the OS, executes a program stored on an HDD (Hard Disk Drive) 204, and thereby executes later described various types of processes according to the present embodiment. A RAM 202 provides a work area and also provides an image memory area for temporarily storing image data. The RAM 202 is also used as a work area for the CPU 201. The HDD 204 is a non-volatile storage region, and stores various programs and image data.

The CPU 201 is connected to the ROM 203, the RAM 202, an operation unit I/F (interface) 206, a network I/F 210, a USB host I/F 213 and an image bus I/F 205, through a system bus 207. The operation unit I/F 206 is an interface for the operation unit 212, which has a touch panel, and outputs to the operation unit 212 image data to be displayed on the operation unit 212. The operation unit I/F 206 sends information, input by a user through the operation unit 212, to the CPU 201.

The network I/F 210 is an interface for connecting the image forming apparatus 101 to the network 102. The USB host I/F 213 is an interface that communicates with a USB storage 214. The USB host I/F 213 outputs data stored in the HDD 204 to the USB storage 214. The USB host I/F 213 also obtains data stored in the USB storage 214, and transfers said data to the CPU 201. The USB host I/F 213 is able to be connected to a plurality of USB devices, including the USB storage 214. The USB storage 214 is an external storage apparatus that stores data, and is removable with regard to the USB host I/F 213.

The image bus I/F 205 connects the system bus 207 to an image bus 208, which transfers image data at high speed, and is a bus bridge for converting data formats. The image bus 208 is configured by a PCI bus, IEEE 1394 or the like. A device I/F 220, a scanner image processing unit 280, and a printer image processing unit 290 are provided on the image bus 208. The scanner 270 and the printer 295 are connected to the device I/F 220, and the device I/F 220 performs conversion between synchronous and asynchronous systems for image data. The scanner image processing unit 280 performs correction, modification and editing for input image data. The printer image processing unit 290 performs correction, resolution conversion and the like in accordance with the printer 295 for printed output image data.

[Software Configuration]

FIG. 3 is a view for illustrating an example configuration of software in the image forming apparatus 101. Operating on an OS 301 are a native program 302, which is a program for controlling printers, fax machines, scanners and the like, and an extension program execution platform 303, which is a platform for executing extension programs 305. The extension program execution platform 303 is, for example, a program for realizing dynamic addition and deletion of programs, and implements the OSGi (Open Service Gateway initiative) framework. An extension program system service 304 is a service that provides shared functions used by the extension programs 305. By the extension programs 305 calling a function of the extension program system service 304, effort to develop shared functions used by the extension programs 305 can be reduced.

Each of the extension programs 305 is a program, operating on the extension program execution platform 303, for extending the functions of the image forming apparatus 101, and is capable of being installed/uninstalled as necessary. Each of the extension programs 305 is capable of being started/stopped as necessary, and when stopped, resources for processing are not consumed, and services and functions are not provided. Each of the extension programs 305 is capable of accessing each module of the image forming apparatus 101, such as another extension program or the RAM 202, via the extension program execution platform 303 or the extension program system service 304. Those of the extension programs 305 that have a UI (User Interface) are capable of displaying an icon on a main menu screen displayed on the operation unit 212 of the image forming apparatus 101. When the operation unit I/F 206 detects that a user has selected an icon via the operation unit 212, the operation unit I/F 206 transmits to the CPU 201 something to that effect. Upon receiving said transmission, the CPU 201 displays the UI for the extension program selected by the user on the operation unit 212.

A download program 500 which will be explained later using FIG. 5 may be included in the extension programs 305. Additionally, the download program 500 itself has a function to download and install on the image forming apparatus 101 the extension programs 305. Therefore, in the present embodiment, the download program 500 is installed on the image forming apparatus 101 by a method other than that for the other extension programs. The different method may be, for example, a method using a function provided by the image forming apparatus 101 as a standard function, wherein an extension program is installed through a manual operation. An introduction program 800 may be given as a kind of program of the extension programs 305. Details of the introduction program 800 are explained later, but installation control of the introduction program 800 is performed by the download program 500. In the present specification, for convenience, control of installation of the introduction program 800 is also referred to as "first installation control", and control of installation of those of the extension programs 305 other than the introduction program 800 is referred to as "second installation control".

Note that the software configuration shown in FIG. 3 only describes basic portions, and other services or the like may be included in accordance with the execution environment. Unnecessary services may be eliminated for reasons of restricting settings or the like.

[Main Menu Screen]

FIG. 4 is a view for illustrating an example configuration of a main menu screen 400 displayed on the operation unit 212 of the image forming apparatus 101. The main menu screen 400 has a program icon display area 401, standard program icons 402, and expansion program icons 403. The program icon display area 401 is an area that displays icons for programs (functions) currently able to be operated through the image forming apparatus 101. Standard program icons 402 are icons for displaying a UI (not shown) for operating standard functions provided by the image forming apparatus 101. Expansion program icons 403 are icons for displaying a UI (not shown) for operating an extension program 305 additionally installed on the image forming apparatus 101. The main menu screen 400 is displayed, for example, when power is turned on and when designated processing is complete or suspended.

[Download Program]

Hereinafter, explanation will be given for a download program according to the present embodiment. FIG. 5 is a view for showing an example of a functional configuration of the download program 500. Each function of the download program 500 is realized by the CPU 201 reading and executing a program corresponding to said function.

The download program 500 has an extension program information management unit 501, an extension program download unit 502, and an extension program information display control unit 503. The extension program information management unit 501 manages information, about the extension programs 305, which are able to be downloaded from the distribution server 103. The extension program information management unit 501 holds in advance identification information for the introduction program 800, which is explained later using FIG. 8, and key information necessary to download the introduction program 800. Based on the identification information for the introduction program 800, the extension program information management unit 501 is provided with functions with regard to the extension program download unit 502: one function is to instruct the download of the introduction program 800 and another is for exchanging information with the introduction program 800. Note that identification information is information for uniquely identifying an extension program on the distribution server 103. More specifically, key information associated with the identification information corresponds to a license key, a product key, a license access number, or the like. This key information is necessary to download or install an application, or to view applications able to be installed. In the present embodiment, for the image forming apparatus 101, key information for each of the extension programs 305 is included in the introduction program 800.

The extension program download unit 502 uses key information or other information held by the introduction program 800 to download the extension programs 305 from the distribution server 103 and install said the extension programs 305 on the image forming apparatus 101. The extension program information display control unit 503 obtains, from the extension program information management unit 501, information about those of the extension programs 305 that are able to be downloaded from the distribution server 103, configures a screen based on said information and provides said screen via the operation unit 212. Furthermore, the extension program information display control unit 503 accepts a user operation via the provided screen.

[Introduction Program]

Hereinafter, explanation will be given for the introduction program 800 according to the present embodiment. FIG. 8 is a view for showing an example of a functional configuration of the introduction program 800. Each function of the introduction program 800 is realized by the CPU 201 reading and executing a program corresponding to said function.

The introduction program 800 has an extension program information management unit 801. The extension program information management unit 801 notifies the download program 500 that information from the distribution server 103 about distributable extension programs (hereinafter, distributable extension program information) has been updated. The extension program information management unit 801 provides distributable extension program information 900 to the download program 500.

[Distributable Extension Program Information]

Figure 9:
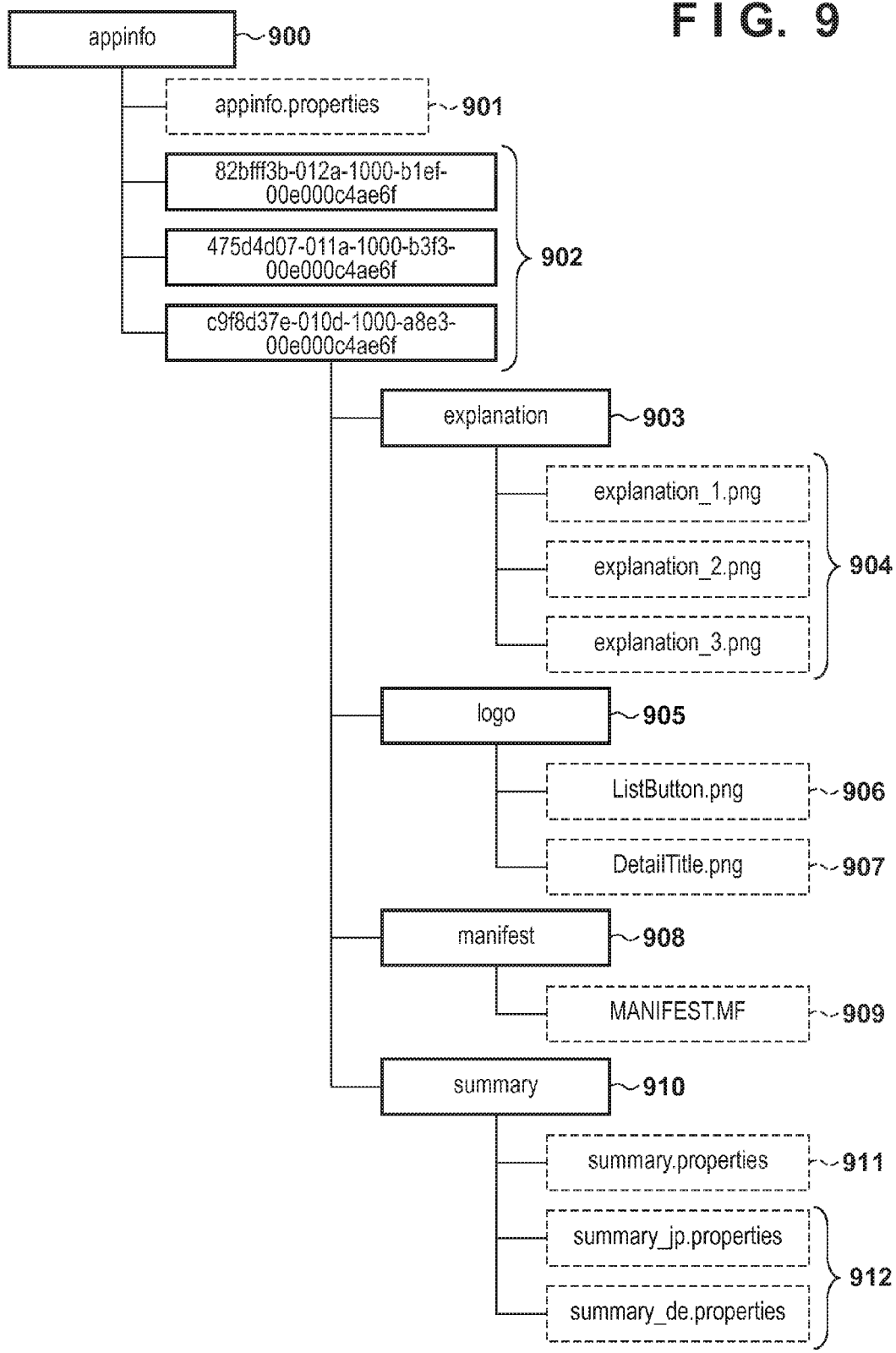
FIG. 9 is a view for illustrating an example configuration of distributable extension program information in accordance with the present application invention.

Hereinafter, explanation will be given for the distributable extension program information according to the present embodiment. FIG. 9 is a view for illustrating an example configuration of the distributable extension program information 900.

Distributable extension program information 900 includes setting information 901 and one or a plurality of pieces of extension program information 902. The setting information 901 is a setting file in which version information for the distributable extension program information 900, identification information for the extension program 305 included in the distributable extension program information 900, or the like, are recorded. The extension program information 902 is information for each of the extension programs 305 included in the distributable extension program information 900, and here three distributable extension programs are indicated. The extension program information 902 is information distinguished by identification information recorded in the setting information 901. Each of the extension program information 902 items includes explanation information 903, logo information 905, manifest information 908 and summary information 910.

The explanation information 903 includes one or a plurality of explanation images 904. An explanation image 904 is, for example, image data displayed by detailed information display panels 703 shown in FIGS. 7A and 7B, on each of which characteristics or the usage for one of the extension programs 305 is drawn. For example, by adding a sequential serial number that is a natural number to the file name for the explanation image 904, it is possible to designate an order at which the explanation images 904 are displayed. Additionally, in the present embodiment, the PNG format is shown as an example of the file format for image data included in the distributable extension program information 900, but limitation is not made to this.

The logo information 905 includes a list screen button logo 906 and a details screen title logo 907. The list screen button logo 906 is image data displayed by extension program information buttons 602 shown on FIG. 6. The details screen title logo 907 is image data displayed by a title image 702 shown on FIGS. 7A and 7B.

The manifest information 908 includes a manifest file 909. The manifest file 909 is an extraction of files packaged in the extension program 305. For example, the manifest file 909 is a file in which information about resources, such as the version of the tool that generated the extension program 305 or the memory usage amount used when executing an extension program, is recorded. Details of the manifest file 909 will be explained later using FIG. 13.

The summary information 910 includes a default summary information file 911 and one or more localization summary information files 912. The default summary information file 911 and the localization summary information files 912 record information not recorded in the manifest file 909, such as an extension program name or overview descriptive text for an extension program. A localization summary information file 912 is created when changing display content in response to the language setting of the image forming apparatus 101. The file name of the localization summary information file 912 includes locale information for the corresponding language (for example, "ja" for Japanese and "de" for German). If there is no instance of the localization summary information file 912 corresponding to the display language of the image forming apparatus 101, data from the default summary information file 911 is used.

Figure 10:
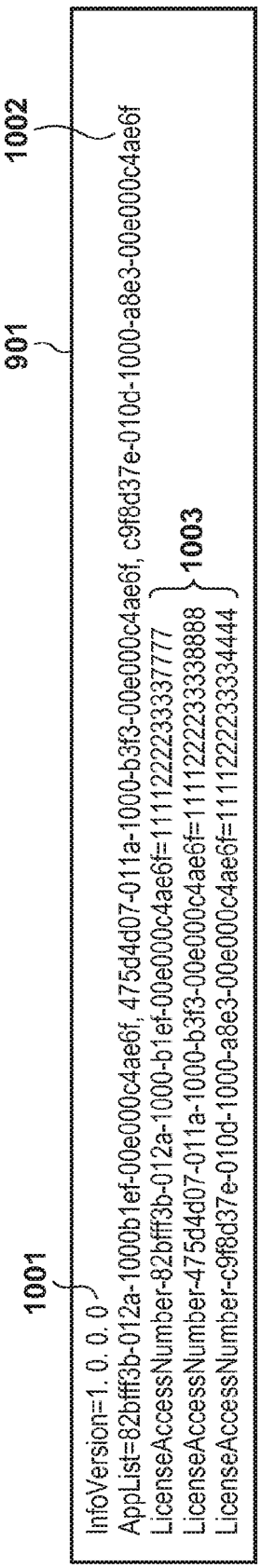
FIG. 10 is a view for showing an example of information included in distributable extension program information in accordance with the present application invention.

FIG. 10 is a view for illustrating an example configuration of the setting information 901. The setting information 901 includes version information 1001, list information 1002 and key information 1003. Version information 1001 is information that shows the version of the distributable extension program information 900. List information 1002 is information that lists identification information for the extension programs 305 included in the distributable extension program information 900. In an extension program list screen 600 shown in FIG. 6, the extension program information buttons 602 line up in the order described by the list information 1002. Key information 1003 is key information associated with identification information for uniquely identifying the extension programs 305 stored on the distribution server 103. When downloading the extension programs 305 from the distribution server 103, the value of the key information 1003 associated with each piece of identification information is designated. The key information 1003 describes key information corresponding to all identification information enumerated by the list information 1002. For example, FIG. 10 shows "LicenseAccessNumber-82bfff3b-012a-1000-b1ef-00e000c4ae6f" as a key for identification information corresponding to the identification information "82bfff3b-012a-1000-b1ef-00e000c4ae6f", and the corresponding value is "1111222233337777".

Figure 11A:
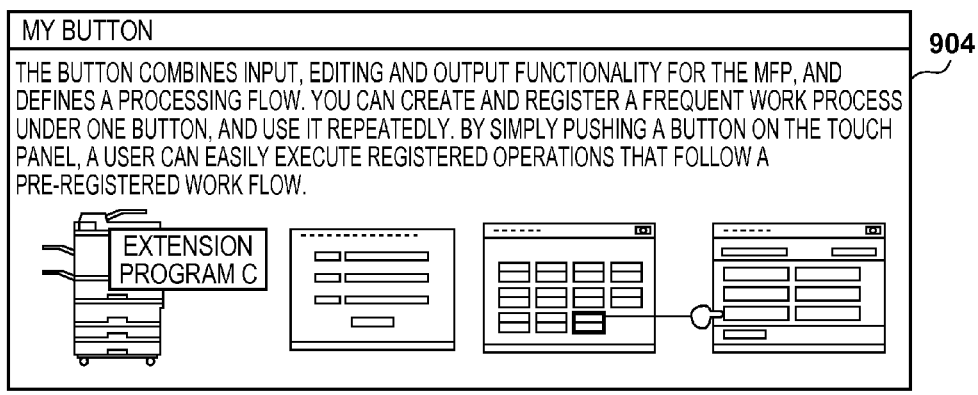
Figure 11B:
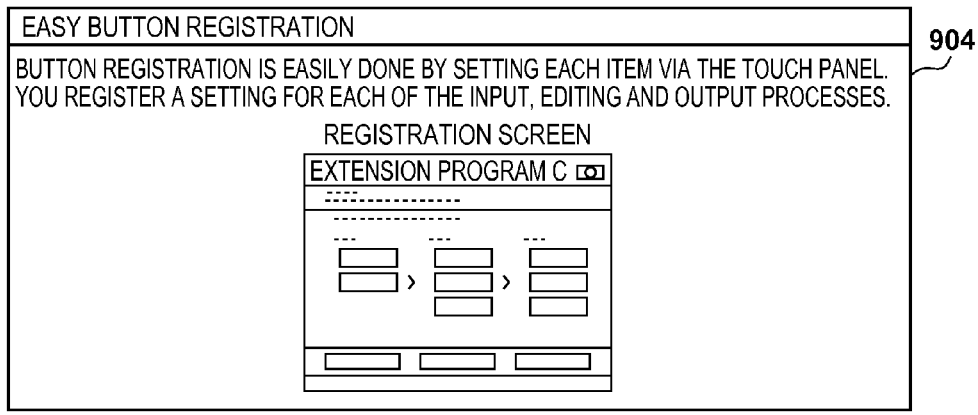

FIG. 11A to FIG. 11C are views for showing examples of the explanation image 904. The image data here is in the PNG format, and the file name is shown.

FIGS. 12A and B are views for showing examples of the logo information 905. FIG. 12A is a view for showing an example of the list screen button logo 906. FIG. 12B is a view for showing an example of the details screen title logo 907. The image data here is in the PNG format, and the file name is shown.

FIG. 13 is a view for illustrating an example configuration of the manifest file 909. The manifest file 909 includes two areas: a program information section 1301 and a resource information section 1302. The program information section 1301 describes information about one of the extension programs 305. Included in the program information section 1301 are an Application-Id for uniquely identifying the extension program 305, a Bundle-Name that shows the name of the extension program, a Bundle-Version that shows version information, or the like. The Application-Id corresponds to identification information included in the setting information 901. The resource information section 1302 describes resource information used by an extension program. Included in the resource information section 1302 is a maximum memory usage amount (MaximumMemoryUsage), a maximum thread usage amount (MaximumThreadUsage), a maximum file space usage amount (MaximumFilespaceUsage), or the like, for the extension program. Additionally, information included in the manifest file 909 is not limited to information shown here, but may further include information required when downloading or installing the extension program 305.

FIGS. 14A and 14B are views for illustrating example configurations of the summary information 910. FIG. 14A is a view for showing an example of the default summary information file 911. FIG. 14B is a view for showing an example of a summary information file for Japanese in the localization summary information files 912. The summary information 910 includes extension program name information 1401 and extension program summary information 1402.

An example was described for the configuration of the distributable extension program information 900 shown in FIG. 9 and data included therein, but these are not limited to the foregoing. For example, configuration may be taken to further define in detail the display and layout of images.

[Download Process for an Extension Program]

Figure 17:
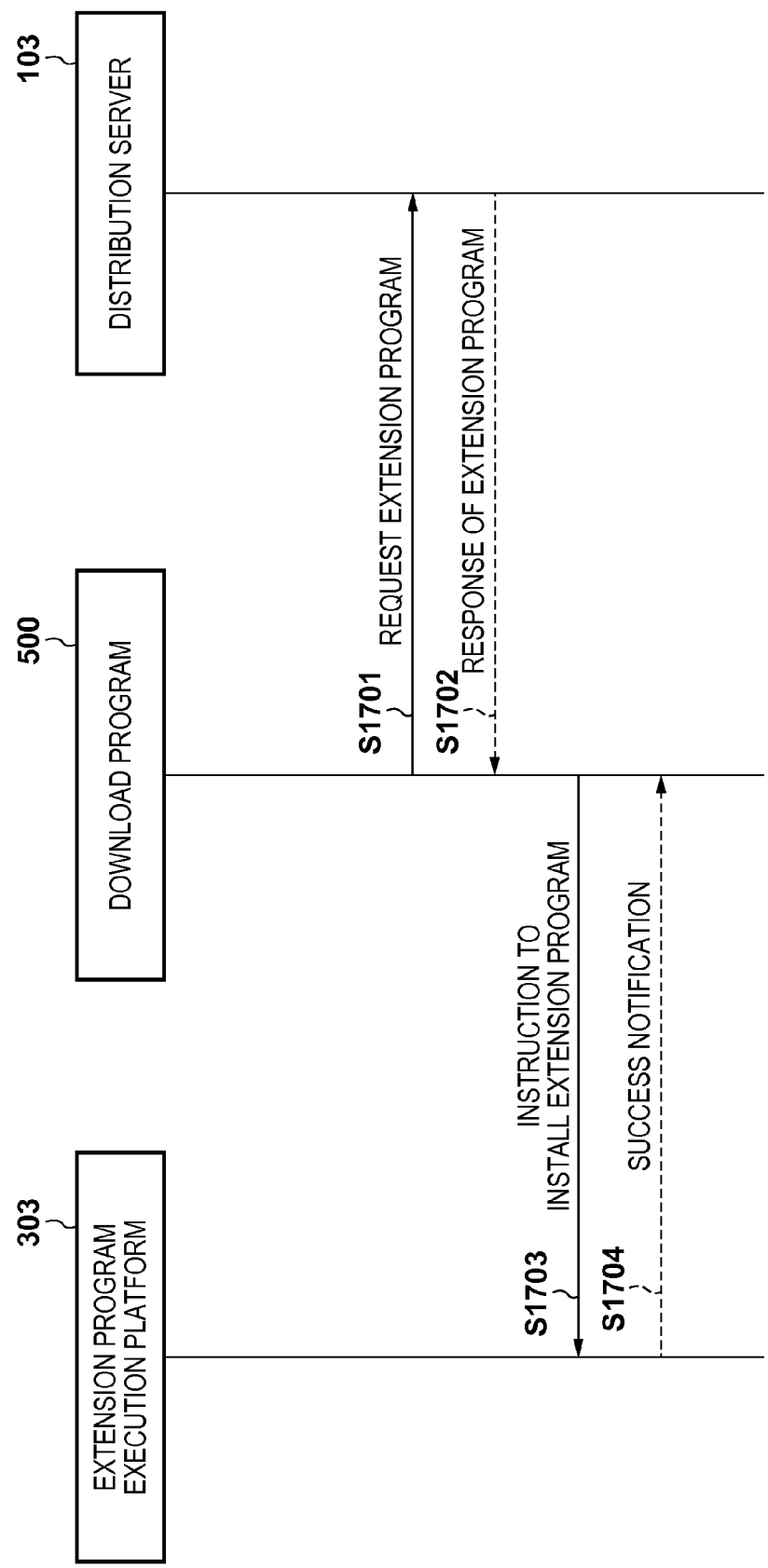
FIG. 17 is a view showing a download process for an extension program in accordance with the present application invention.

Upon receiving an instruction from a user, the download program 500 performs control to download one of the extension programs 305 from the distribution server 103 and install the extension program 305. Using FIG. 17, explanation will be given below of a process for downloading the extension program 305. Step S1701 to step S1704 represent each step.

In step S1701, the download program 500 uses the key information 1003 and the identification information for the extension program 305, stored by the extension program information management unit 501, to request the extension program 305 from the distribution server 103.

In step S1702, upon receiving the request, as a response, the distribution server 103 replies to the download program 500 with the extension program 305 corresponding to the identification information and the key information 1003.

In step S1703, the download program 500 instructs the extension program execution platform 303 to install the extension program 305 received from the distribution server 103.

In step S1704, the extension program execution platform 303 executes the installation of the extension program 305 which is designated, and notifies the download program 500 of the installation result. This processing flow then terminates.

Additionally, before the processing of step S1701, the download program 500 may perform processing to use the identification information and the key information 1003 to perform, with regard to the distribution server 103, a query about the extension program 305 designated by a user, and, based on the response to the query, determine whether it is possible to download and install the extension program 305 without any problem.

[Download Process for Introduction Program]

At a time such as when the download program 500 is first activated or a predetermined a date and a time is reached, or a time when the download program 500 receives an update instruction from a user (pressing an update button 604 in FIG. 6), the download program 500 queries the distribution server 103 for information about the introduction program 800. The download program 500 then, as necessary, downloads the introduction program 800 from the distribution server 103 and installs the introduction program 800. Using FIG. 15, explanation will be given below of a process for downloading the introduction program 800. Step S1501 to step S1507 represent each step.

In step S1501, the download program 500 uses the key information 1003 and the identification information for the introduction program 800, stored by the extension program information management unit 501, to request information of the introduction program 800 from the distribution server 103. Here, information of a version of the introduction program 800 which can be distributed is included in the requested information.

In step S1502, upon receiving the request, the distribution server 103 replies to the download program 500 with the response of information about an extension program corresponding to the identification information and the key information 1003 (that is, information that includes information of a version of the introduction program 800 that is able to be distributed).

In step S1503, the download program 500 compares the version information for the instance of the introduction program 800 that is currently installed with the version information included in the information about the introduction program 800 received from the distribution server 103. If the version information differs, the download program 500 performs step S1504, enabling the download of the new version of the introduction program 800. However, if the version information matches, the download program 500 determines that it is unnecessary to download the introduction program 800 from the distribution server 103 as the latest version of the introduction program 800 is installed, and this processing flow terminates.

In step S1504, the download program 500 uses the identification information and the key information 1003 for the introduction program 800 to request the latest version of the introduction program 800 from the distribution server 103.

In step S1505, upon receiving the request, as a response, the distribution server 103 replies to the download program 500 with the introduction program 800 corresponding to the identification information and the key information 1003.

In step S1506, the download program 500 instructs the extension program execution platform 303 to install the introduction program 800 received from the distribution server 103.

In step S1507, the extension program execution platform 303 performs the installation of the introduction program 800, and notifies the download program 500 of the result of said installation. This processing flow then terminates.

[Updating Process]

Figure 16:
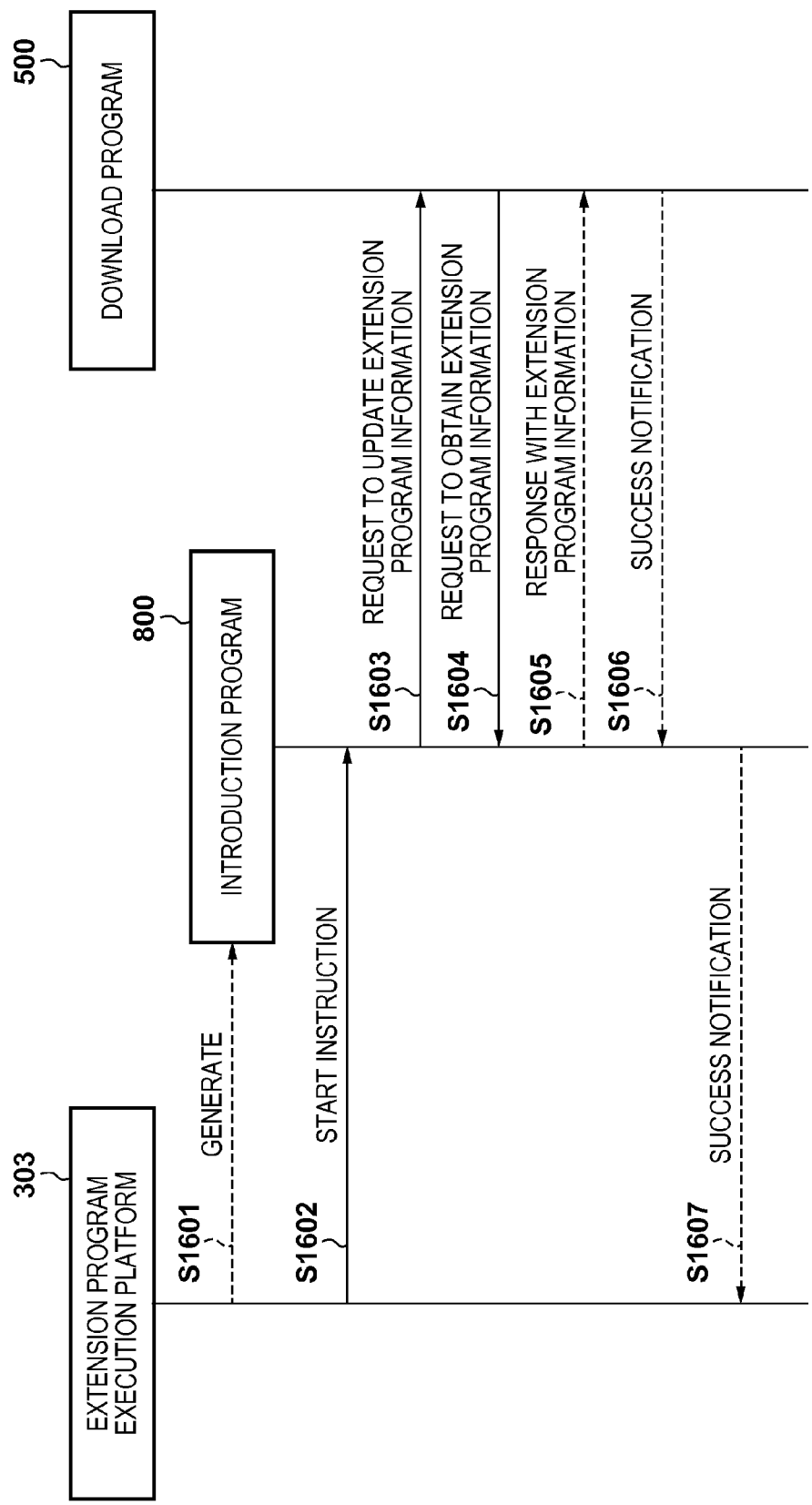
FIG. 16 is a view for showing an update process of the introduction program in accordance with the present application invention.

When started, the introduction program 800 notifies the download program 500 that the distributable extension program information 900 has been updated. In response to the update notification from the introduction program 800, the download program 500 obtains the distributable extension program information 900 from the introduction program 800. Using FIG. 16, explanation will be given below of a process for updating the introduction program 800. Step S1601 to step S1607 represent each step.

In step S1601, the extension program execution platform 303 generates the introduction program 800. This generation indicates disposing and configuring the introduction program 800 that was downloaded within the image forming apparatus 101 so that the introduction program 800 can be executed.

Thus, the introduction program 800 is loaded into the RAM 202, and enters a state of being able to be executed by the CPU 201.

In step S1602, the extension program execution platform 303 instructs initiation of the introduction program 800.

In step S1603, the introduction program 800 notifies the download program 500 to the effect that the distributable extension program information 900 has been updated.

In step S1604, upon receiving an update notification from the introduction program 800, as a response the download program 500 makes a request to the introduction program 800 to obtain the distributable extension program information 900.

In step S1605, upon receiving the request from the download program 500, the introduction program 800, as a response, transmits the distributable extension program information 900 to the download program 500. For the distributable extension program information 900 that is transmitted, configuration may be taken such that only an updated differential is transmitted, or configuration may be taken such that the entirety of the distributable extension program information 900 after the update is transmitted.

In step S1606, upon receiving the distributable extension program information 900 after the update from the introduction program 800, the download program 500 transmits the result of updating processing to the introduction program 800.

In step S1607, upon receiving the result of updating processing for the distributable extension program information 900 from the download program 500, the introduction program 800 transmits the result of initiation processing to the extension program execution platform 303. This processing flow then terminates.

[Extension Program Information Display]

Using FIG. 6, FIG. 7A, and FIG. 7B, explanation will be given for screens the download program 500 displays on the operation unit 212.

FIG. 6 is a view for illustrating an example configuration of the extension program list screen 600 that the download program 500 displays on the operation unit 212. The extension program list screen 600 has a button display panel 601, the extension program information buttons 602, change buttons 603 and the update button 604. The button display panel 601 is a panel for handling the extension program information buttons 602 together. There are cases where a plurality of button display panels 601 are prepared in accordance with the number of the extension program information buttons 602. Extension program information buttons 602 are buttons that display an overview of the extension programs 305 that are distributable by combining an image and text. Images displayed as the extension program information buttons 602 correspond to the explanation images 904 shown in FIG. 9. Upon detecting that one of the extension program information buttons 602 has been pressed, the download program 500 displays a detailed information screen 700, which is explained later using FIGS. 7A and 7B. Change buttons 603 are buttons for changing the button display panel 601 to be displayed when there is a plurality of the button display panel 601. The update button 604 is a button for updating the distributable extension program information 900 held by the download program 500. In other words, the processing flow shown in FIG. 15 is performed when the update button 604 is pressed.

Figure 7A:
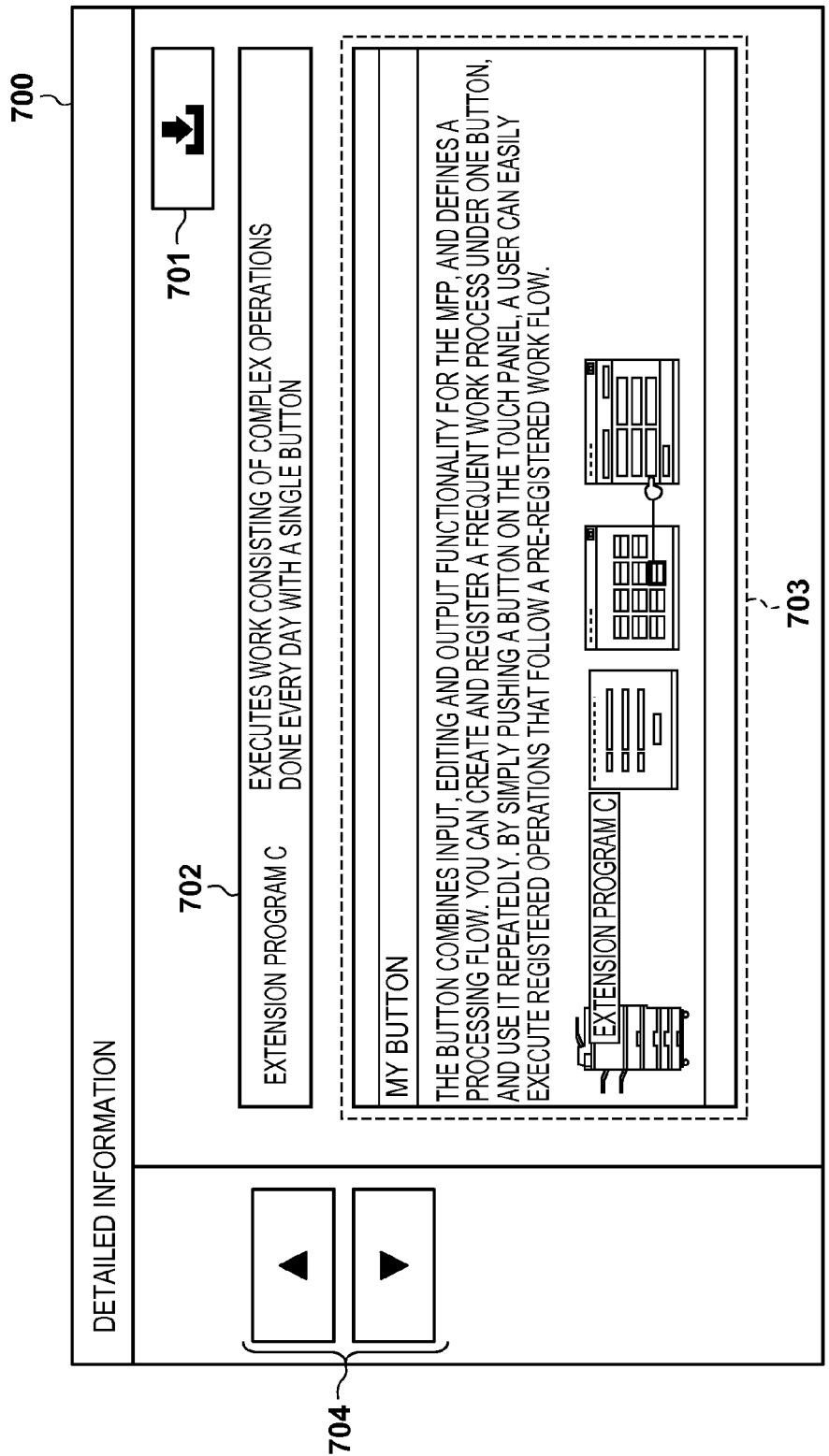

FIGS. 7A and 7B are views for showing examples of detailed information screens 700 the download program 500 displays on the operation unit 212. FIG. 7A shows an example configuration of a screen when the extension program 305 that is displayed is able to be downloaded and installed without any problem. FIG. 7B shows an example configuration of a screen when there are insufficient resources to download and install the extension program 305 that is displayed.

The icon for a download button 701 is different in FIG. 7A and FIG. 7B. The process to change the icon for the download button 701 will be explained later. The detailed information screen 700 has the download button 701, the title image 702, a detailed information display panel 703 and a change button 704. The download button 701 is a button for instructing the download and installation of the extension program 305 for which detailed information is displayed.

The title image 702 is an image of the title of the extension program 305. The title image 702 corresponds to the image for the details screen title logo 907 in FIG. 9. The detailed information display panel 703 is a panel for displaying an image on which the characteristics or usage of the extension program 305 is drawn. There may be cases where a plurality of the detailed information display panel 703 are prepared in accordance with the number of images on which characteristics or usage is drawn. The detailed information display panel 703 corresponds to the explanation images 904 shown in FIG. 9. The change button 704 is a button for changing the detailed information display panel 703 which is displayed in a case where there is a plurality of the detailed information display panel 703.

[Button Display Change Process]

FIG. 18 is a flowchart for showing an example of a change process for the download button 701. Step S1801 to step S1803 represent each step.

In step S1801, the download program 500 obtains an unused resource amount for the image forming apparatus 101 via the extension program execution platform 303, the extension program system service 304, or the like. Next, the download program 500 compares the obtained unused resource amount with a resource amount used by an extension program described in the manifest file 909 for the extension program 305 obtained from the introduction program 800. In other words, it is judged whether a resource amount required to install the extension program 305 that is to be newly installed can be secured. If the resource amount to be used by the extension program to be newly installed is smaller (YES in step S1801), the process transitions to step S1802. Otherwise (NO in step S1801), the process transitions to step S1803.

In step S1802, the download program 500 obtains the default icon for the download button 701 (that is, the image shown in FIG. 7A) held by the download program 500, and sets the default icon as the icon for the download button 701.

In step S1803, the download program 500 obtains the resource deficiency icon for the download button 701 (that is, the image shown in FIG. 7B) held by the download program 500, and sets the resource deficiency icon as the icon for the download button 701. This processing flow then terminates.

Additionally, in the present embodiment, whether downloading is possible is shown by changing the display of an icon in accordance with a condition of availability of a resource, but limitation is not made to this. For example, configuration may be taken to display a predetermined message, and to what extent a resource is insufficient may be displayed.

[Extension Program Download and Installation]

Figure 19B:
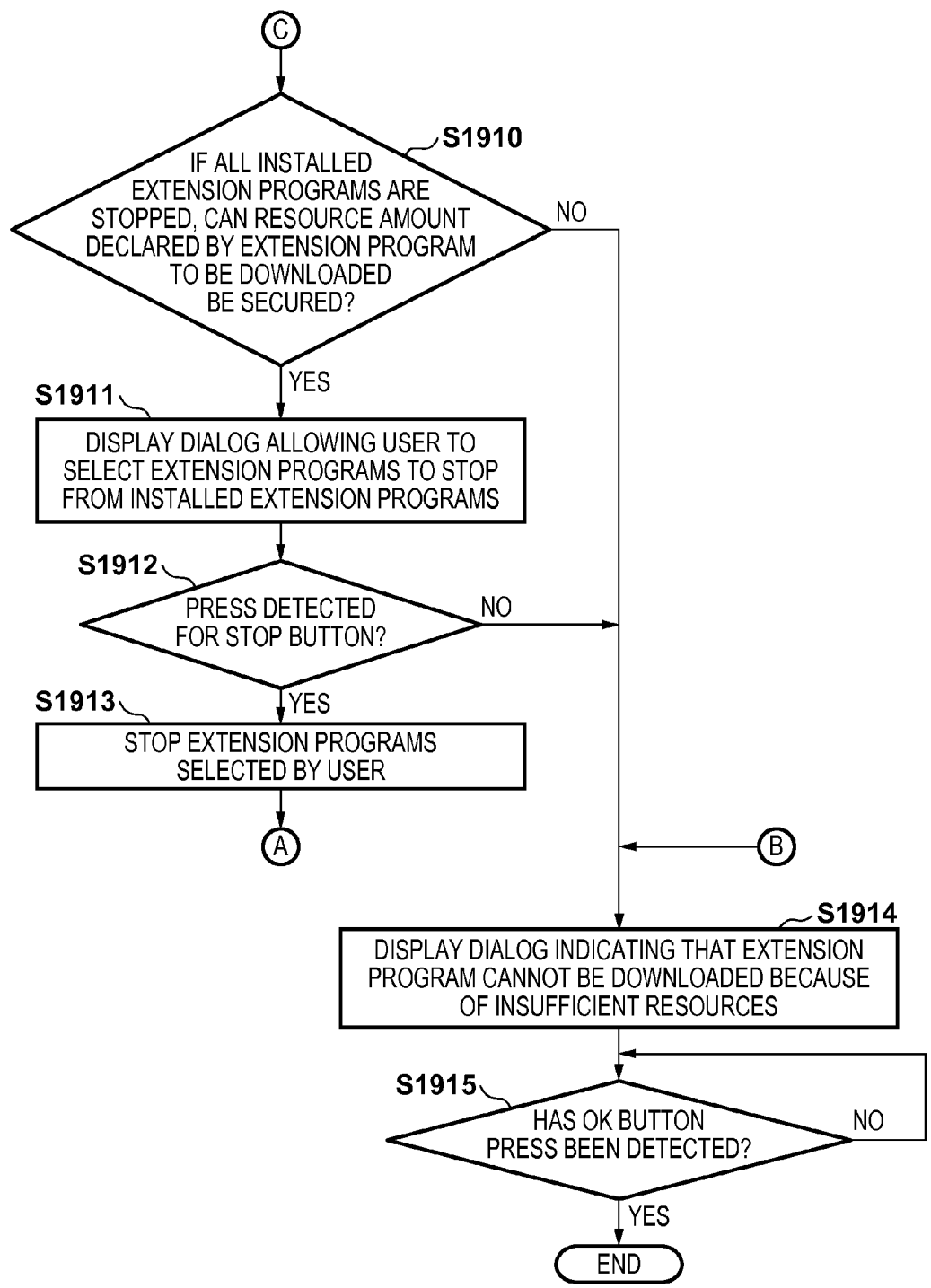

Upon detecting that the download button 701 was pressed during display of the detailed information screen 700, the download program 500 downloads the designated extension program 305 from the distribution server 103 and installs the designated extension program 305. Using FIGS. 19A and 19B, explanation will be given below of extension program download and install processes. Step S1901 to step S1915 represent each step.

In step S1901, the download program 500 obtains an unused resource amount for the image forming apparatus 101 via the extension program execution platform 303, the extension program system service 304, or the like. Next, the download program 500 refers to the manifest file 909, for the extension program 305, included in the distributable extension program information 900 held by the download program 500, and compares the resource amount, to be used by the extension program 305 to be newly installed, with the obtained unused resource amount. If the resource amount to be used by the extension program 305 to be newly installed is smaller (YES in step S1901), processing transitions to step S1902, otherwise (NO in step S1901), processing transitions to step S1904.

In step S1902, the download program 500 uses the key information 1003 and identification information obtained from the introduction program 800 to download the extension program 305 designated by a user from the distribution server 103. In step S1903, the download program 500 instructs the extension program execution platform 303 to install the extension program 305 downloaded from the distribution server 103. This processing flow is then terminated.

In step S1904, the download program 500 determines whether the extension program 305 was installed by the download program 500 previously. If there is an already installed extension program 305 (YES in step S1904), processing transitions to step S1905, otherwise (NO in step S1904), processing transitions to step S1914.

In step S1905, the download program 500 determines whether the resource insufficient to download and install the extension program 305 designated by the user is file space (in other words, a storage area). If the insufficient resource is file space (YES in step S1905), processing transitions to step S1906, otherwise (NO in step S1905), processing transitions to step S1910.

In step S1906, the download program 500 refers to the manifest file 909 for each already installed extension program 305 for the file space consumption amount each already installed extension program 305 declares the use of, and calculates the total thereof. The download program 500 then compares the calculated file space consumption amount with the file space consumption amount insufficient to install the extension program 305 to be newly installed. If the result of the comparison is that the insufficient file space consumption amount is smaller (YES in step S1906), processing transitions to step S1907, otherwise (NO in step S1906), processing transitions to step S1914.

In step S1907, the download program 500 displays an uninstalled extension program selection dialog 2000 as shown in FIG. 20 on the operation unit 212. In step S1908, the download program 500 waits for a button press from a user.

FIG. 20 is a view for showing an example of the uninstalled extension program selection dialog 2000 the download program 500 displays on the operation unit 212. The uninstalled extension program selection dialog 2000 includes an uninstall button 2001, a cancel button 2002, an extension program list 2003 and a message label 2004. The uninstall button 2001 is a button for instructing the uninstallation of extension programs 305. The uninstall button 2001 enters a pressable state only when one or more extension programs are selected to be uninstalled. The cancel button 2002 is a button for cancelling the uninstallation of the extension programs 305. The extension program list 2003 is a list that lists extension programs 305 that are able to be uninstalled. It is possible to select a plurality of extension programs to be uninstalled. The message label 2004 is a label that displays a message for prompting an operation by a user. When a user presses the uninstall button 2001 or the cancel button 2002, a button press event is generated.

In step S1908, upon detecting a button press event, the download program 500 determines whether the pressed button was the uninstall button 2001. If the uninstall button 2001 was pressed (YES in step S1908), processing transitions to step S1909, and if the cancel button 2002 was pressed (NO in step S1908), processing transitions to step S1914.

In step S1909, the download program 500 instructs the extension program execution platform 303 to uninstall the extension programs 305 selected by the user. Then transition is made to step S1901.

In step S1910, the download program 500 calculates the memory consumption amount and thread consumption amount declared to be used by the already installed extension programs 305. The download program 500 then compares the calculated memory consumption amount and thread consumption amount with the memory consumption amount and thread consumption amount insufficient to install the extension program 305 to be newly installed, respectively. As a result of the comparison, if both of the memory consumption amount and the thread consumption amount, that are insufficient if the extension program to be newly installed is installed, are smaller (YES in step S1910), processing transitions to step S1911. Otherwise (NO in step S1910), the process transitions to step S1914.

In step S1911, the download program 500 displays a dialog 2100 for selecting extension programs to stop as shown in FIG. 21 on the operation unit 212. In step S1912, the download program 500 waits for a button press from a user.

FIG. 21 is a view for showing an example of the dialog 2100 for selecting extension programs to stop which the download program 500 displays on the operation unit 212. The dialog 2100 for selecting extension programs to stop includes a stop button 2101, a cancel button 2102, an extension program list 2103, and a message label 2104. The stop button 2101 is a button for instructing the stopping of extension programs 305. The stop button 2101 enters a pressable state only when one or more extension programs are selected to be stopped. The cancel button 2102 is a button for cancelling the stopping of the extension programs 305. The extension program list 2103 is a list that lists extension programs 305 that are able to be stopped. It is possible to select a plurality of extension programs to be stopped. The message label 2104 is a label that displays a message for prompting an operation by a user. When a user presses the stop button 2101 or the cancel button 2102, a button press event is generated.

In step S1912, upon detecting a button press event, the download program 500 determines whether the pressed button was the stop button 2101. If the stop button 2101 is pressed (YES in step S1912), processing transitions to step S1913, and if the cancel button is pressed (NO in step S1912), processing transitions to step S1914.

In step S1913, the download program 500 instructs the extension program execution platform 303 to stop the extension programs 305 selected by the user. Then transition is made to step S1901.

Figure 22:
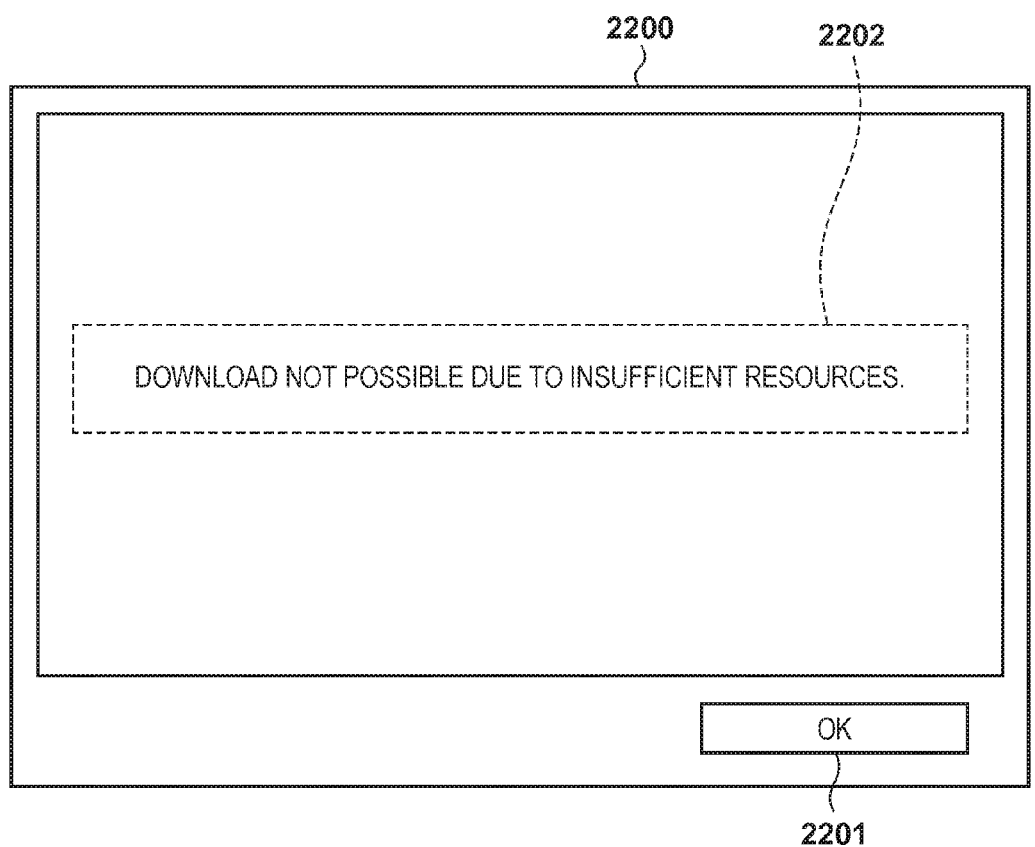
FIG. 22 is a view for showing an example of a download impossible notification dialog in accordance with the present application invention.

In step S1914, the download program 500 displays a download impossible notification dialog 2200 as shown FIG. 22 on the operation unit 212. In step S1915, the download program 500 waits for the pressing of an OK button 2201.

FIG. 22 is a view for showing an example of the download impossible notification dialog 2200 displayed by the download program 500 on the operation unit 212. The download impossible notification dialog 2200 includes the OK button 2201 and a message label 2202. The OK button 2201 is a button for closing the download impossible notification dialog 2200. The message label 2202 is a label for displaying a message communicating to a user to the effect that an extension program cannot be downloaded due to a resource deficiency. When the user presses the OK button 2201, a button press event is generated.

In step S1915, upon detecting the press of the OK button 2201 (YES in step S1915), the download program 500 closes the download impossible notification dialog 2200, and this processing flow terminates.

By virtue of the present embodiment, accordingly, an information processing apparatus having means for a user to easily and at low-cost download an extension program from an external system and then install said extension program can be provided. In addition, it becomes unnecessary to input by hand or manage key information, such as product keys, required when installing an extension program, and user convenience is improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-158990, filed Aug. 4, 2014, which is hereby incorporated by reference herein in its entirety.

What is claimed is:

1. A function extension method in an information processing apparatus comprising one or more hardware processors, and one or more memories storing instructions that, when executed by the one or more hardware processors, cause the one or more hardware processors to function as an extension unit for performing control to download an extension program for extending functionality from an external server and to install the extension program, the method comprising:

by the extension unit,
performing control to download from the external server an introduction program that provides information about an extension program which can be downloaded from the external server, and to install the introduction program, wherein the introduction program includes information about a license for the extension program necessary to download and install the extension program;

obtaining, from the installed introduction program, the information about the extension program which can be downloaded;

providing a screen for displaying the obtained information about the extension program and for receiving an instruction to install the extension program; and in response to receipt of the instruction to install the extension program from a user via the screen, after the information corresponding to the extension program is obtained from the introduction program, performing control, using the information about the license included in the obtained information, to download the extension program from the external server and install the extension program.

2. An information processing apparatus comprising:
one or more hardware processors; and
one or more memories storing instructions that, when executed by the one or more hardware processors, cause the one or more hardware processors to function as an extension unit for performing control to download an extension program for extending functionality from an external server and to install the extension program, the extension unit comprising:

a first install control unit configured to perform control to download from the external server an introduction program that provides information about the extension program which can be downloaded from the external server, and to install the introduction program, wherein the introduction program includes information about a license for the extension program necessary to download and install the extension program;

an obtaining unit configured to obtain, from the installed introduction program, the information about the extension program which can be downloaded;

a provision unit configured to provide a screen for displaying the information about the extension program obtained by the obtaining unit and for receiving an instruction to install the extension program; and a second install control unit configured, in response to receipt of the instruction to install the extension program from a user via the screen, after the information corresponding to the extension program is obtained by the obtaining unit from the introduction program, to perform control, using the information about the license included in the obtained information, to download the extension program from the external server and install the extension program.

3. The information processing apparatus according to claim 1, wherein the first install control unit compares a version of an already installed introduction program with a version of a new introduction program that can be downloaded from the external server, and when the versions are different, performs control to download and install the new introduction program.

4. The information processing apparatus according to claim 3, wherein in response to the new introduction program being installed, the obtaining unit obtains information about an extension program that is able to be downloaded, and the provision unit updates information, displayed on the screen, about the extension program that is able to be downloaded.

5. The information processing apparatus according to claim 1, wherein the first install control unit performs control to download and install the introduction program at least one of: when an instruction from a user is received, when a pre-set date and time is reached, or when the information processing apparatus is activated.

6. The information processing apparatus according to claim 1, wherein the provision unit changes content displayed on the screen in accordance with a condition of availability of a resource required when installing the extension program.

7. The information processing apparatus according to claim 1, wherein the provision unit, if a resource required when downloading and installing the extension program is insufficient, further provides a reception screen for receiving an instruction to uninstall or stop an already installed extension program, and wherein the second install control unit, based on an instruction input via the reception screen, performs control to download the extension program and install the extension program after performing processing with regard to the already installed extension program.

8. The information processing apparatus according to claim 7, wherein the resource is a storage region for storing the extension program or a thread for executing the extension program, and wherein the resource required when installing the extension program is calculated based on resource information included in information about the extension program obtained by the obtaining unit.

9. A non-transitory computer readable medium storing a program for causing a computer to function as:

a first install control unit configured to perform control to download from an external server an introduction program that provides information about an extension program which can be downloaded from the external server, and to install the introduction program, wherein the introduction program includes information about a license for the extension program necessary to download and install the extension program;

an obtaining unit configured to obtain, from the installed introduction program, the information about the extension program which can be downloaded;

a provision unit configured to provide a screen for displaying the information about the extension program obtained by the obtaining unit and for receiving an instruction to install the extension program; and a second install control unit configured, in response to receipt of the instruction to install the extension program from a user via the screen, after the information corresponding to the extension program is obtained by the obtaining unit from the introduction program, to perform control, using the information about the license included in the obtained information, to download the extension program from the external server and install the extension program.

\* \* \* \* \*